US012762886B2

(12) United States Patent
Ali et al.

(10) Patent No.: US 12,762,886 B2
(45) Date of Patent: Oct. 13, 2026

(54) ROAD SIDE VEHICLE OCCUPANCY DETECTION SYSTEM

(71) Applicant: INVISION AI, INC., Toronto (CA)

(72) Inventors: Karim Ali, Toronto (CA); Zhijie Wang, Mississauga (CA); Seydi Zorlu, Whitby (CA); Arash Mohtat, North York (CA); Carlos Becker, Lausanne (CH)

(73) Assignee: INVISION AI, INC., Toronto (CA)

( * ) Notice: Subject to any disclaimer, the term of this patent is extended or adjusted under 35 U.S.C. 154(b) by 0 days.

(21) Appl. No.: 19/198,801

(22) Filed: May 5, 2025

(65) Prior Publication Data

US 2025/0267188 A1 Aug. 21, 2025

Related U.S. Application Data

(63) Continuation of application No. 18/482,557, filed on Oct. 6, 2023, now Pat. No. 12,309,223, which is a (Continued)

(51) Int. Cl.

*G06V 40/10* (2022.01)
*G06F 9/455* (2018.01)

(Continued)

(52) U.S. Cl.

CPC .......... *G06V 40/10* (2022.01); *G06F 9/45558* (2013.01); *G06F 11/1425* (2013.01);

(Continued)

(58) Field of Classification Search

CPC ...... G06V 40/103; G06V 10/25; G06V 20/54; H04N 7/181; H04N 7/188; H04N 23/56; H04N 23/66

See application file for complete search history.

(56) References Cited

U.S. PATENT DOCUMENTS

| | | | | |
|---|---|---|---|---|
| 6,198,409 B1 * | 3/2001 | Schofield | .................. | B60R 1/12 340/436 |
| 6,392,315 B1 * | 5/2002 | Jones | ...................... | F02P 17/12 307/10.6 |

(Continued)

FOREIGN PATENT DOCUMENTS

| | | |
|---|---|---|
| WO | 2008099146 A1 | 8/2008 |
| WO | 2021053393 A1 | 3/2021 |

OTHER PUBLICATIONS

Birch et al.; Automated Vehicle Occupancy Monitoring; Optical Engineering, vol. 43, No. 8, pp. 1828-1832, 2004.

(Continued)

*Primary Examiner* — Frank F Huang

(74) *Attorney, Agent, or Firm* — Norton Rose Fulbright Canada LLP

(57) ABSTRACT

A system for detecting occupancy of a vehicle travelling in a direction of travel along a road. The system includes a roadside imaging device positioned on a roadside, and a first roadside light emitter, and a roadside vehicle detector. A processor is configured to receive a signal from the roadside vehicle detector, command the first roadside light emitter to emit light according to a first pattern for a first duration, command the roadside imaging device to capture images of the side of the vehicle, and compute a vehicle occupancy, in each of the captured images by determining one or more regions of interest in each of the captured images, and determining a number of visible occupants in the one or more regions of interest. The processor determines a most likely number of occupants based on each determined vehicle occupancy.

20 Claims, 30 Drawing Sheets

Related U.S. Application Data continuation of application No. 17/689,783, filed on Mar. 8, 2022, now Pat. No. 11,804,058, which is a continuation of application No. 17/465,681, filed on Sep. 2, 2021, now Pat. No. 11,308,316.

(51) Int. Cl.

| | |
|---|---|
| ***G06F 11/14*** | (2006.01) |
| ***G06F 16/182*** | (2019.01) |
| ***G06F 16/23*** | (2019.01) |
| ***G06F 18/25*** | (2023.01) |
| ***G06V 10/25*** | (2022.01) |
| ***G06V 10/34*** | (2022.01) |
| ***G06V 20/54*** | (2022.01) |
| ***G06V 20/59*** | (2022.01) |
| ***H04L 67/104*** | (2022.01) |
| ***H04N 7/18*** | (2006.01) |
| ***H04N 23/56*** | (2023.01) |
| ***H04N 23/66*** | (2023.01) |

(52) U.S. Cl.

CPC ........ *G06F 16/182* (2019.01); *G06F 16/2365* (2019.01); *G06F 18/251* (2023.01); *G06V 10/25* (2022.01); *G06V 10/34* (2022.01); *G06V 20/54* (2022.01); *G06V 20/59* (2022.01); *G06V 40/103* (2022.01); *H04L 67/1046* (2013.01); *H04L 67/1048* (2013.01); *H04N 7/181* (2013.01); *H04N 7/188* (2013.01); *H04N 23/56* (2023.01); *H04N 23/66* (2023.01); *G06F 2009/45583* (2013.01); *G06V 2201/08* (2022.01)

(56) References Cited

U.S. PATENT DOCUMENTS

| | | | | |
|---|---|---|---|---|
| 6,720,920 | B2 * | 4/2004 | Breed | B60N 2/2863 342/357.31 |
| 7,079,017 | B2 * | 7/2006 | Lang | G01S 15/931 340/436 |
| 7,579,940 | B2 * | 8/2009 | Schofield | B60R 11/0235 701/487 |
| 8,682,035 | B2 * | 3/2014 | Stiegler | G06T 7/20 701/1 |
| 11,308,316 | B1 | 4/2022 | Ali et al. | |
| 11,475,576 | B2 * | 10/2022 | Kim | G06T 7/50 |
| 2002/0167589 | A1 * | 11/2002 | Schofield | B60Q 5/006 348/E7.086 |
| 2005/0134983 | A1 * | 6/2005 | Lynam | B60R 1/12 359/872 |
| 2007/0073473 | A1 * | 3/2007 | Altan | G01S 13/862 701/518 |
| 2007/0181810 | A1 * | 8/2007 | Tan | G01S 7/4811 250/341.1 |
| 2008/0175438 | A1 | 7/2008 | Alves | |
| 2010/0139995 | A1 * | 6/2010 | Rudakevych | B62D 55/06 180/9.32 |
| 2011/0063445 | A1 * | 3/2011 | Chew | G08G 5/065 348/E7.085 |
| 2012/0158250 | A1 * | 6/2012 | Stiegler | G06T 7/20 701/45 |
| 2013/0093891 | A1 | 4/2013 | Tyrer et al. | |
| 2015/0294144 | A1 | 10/2015 | Konishi | |
| 2018/0157922 | A1 | 6/2018 | Miyamoto | |
| 2020/0234067 | A1 | 7/2020 | Hayashi et al. | |
| 2020/0372792 | A1 | 11/2020 | Li et al. | |
| 2021/0124916 | A1 | 4/2021 | Boon et al. | |
| 2021/0342580 | A1 | 11/2021 | Desai et al. | |
| 2022/0036473 | A1 * | 2/2022 | Thompson | G06Q 40/08 |
| 2022/0147745 | A1 * | 5/2022 | Ghadiok | G06V 10/82 |

OTHER PUBLICATIONS

Xu et al.; A Machine Learning Approach to Vehicle Occupancy Detection; 17th International IEEE Conference on Intelligent Transportation Systems (ITSC), pp. 1232-1237, 2014, Qingdao, China. doi: 10.1109/ITSC.2014.6957856.

Kumar et al.; VPDS: An AI-Based Automated Vehicle Occupancy and Violation Detection System; The Thirty-First AAAI Conference on Innovative Applications of Artificial Intelligence (IAAI-19), pp. 9498-9503, 2019.

European Patent Office; Supplementary European Search Report dated Jul. 15, 2025 on Application No. 22862482.1.

Lee et al.; "A Framework for Detecting Vehicle Occupancy Based on the Occupant Labeling Method"; Journal of Advanced Transportation. Jan. 8, 2020. 10.1155/2020/8870211

Tyrer J R and Lobo L M; "An optical method for automated roadside detection and counting of vehicle occupants"; Proceedings of the Institution of Mechanical Engineers, Part D: Journal of Automobile Engineering. 2008;222(5):765-774. doi:10.1243/09544070JAUTO562.

* cited by examiner

ROAD SIDE VEHICLE OCCUPANCY DETECTION SYSTEM

CROSS REFERENCE TO RELATED APPLICATION

This application is a continuation application of U.S. patent application Ser. No. 18/482,557 filed Oct. 6, 2023 which is application of U.S. patent application Ser. No. 17/689,783 filed Mar. 8, 2022 which is a continuation application of U.S. patent application Ser. No. 17/465,681 filed Sep. 2, 2021, the entire contents of which is hereby incorporated by reference.

FIELD

The improvements generally relate to the field of vehicle occupancy detection systems, and more specifically to automated vehicle detection occupancy systems and methods.

INTRODUCTION

Determining vehicle occupancy typically includes the use of a physical human presence, such as police or other policy enforcement personnel, to accurately determine a vehicle occupancy.

Automated vehicle occupancy detection suffers from a lack of accuracy and potential latency issues. Automated vehicle occupancy detection also suffers from a lack of accuracy associated with various road conditions which are likely to occur during operation. Traditional automated vehicle occupancy systems can also be expensive to implement, experience impaired functioning when moved, or be unreliable and difficult to repair or re-calibrate.

Automated vehicle occupancy detection systems which are more accurate, faster, more reliable, easier to move or install, more robust, or require less calibration are desirable.

SUMMARY

In accordance with one aspect, there is provided a system for detecting occupancy of a vehicle travelling in an expected direction of travel along a road. The system involves a first roadside imaging device positioned on a roadside, having a first field of view of the road, the first field of view incident on a side of the vehicle when the vehicle is on the road within the first field of view; a first roadside light emitter emitting light towards vehicles in the first field of view; a roadside vehicle detector; a processor, in communication with a memory, configured to: receive a signal from the roadside vehicle detector indicating that the vehicle is within the first field of view or proximate, relative to the expected direction of vehicle travel, to the first field of view; command the first roadside light emitter to emit light according to a first pattern for a first duration; command the first roadside imaging device to capture one or more images of the side of the vehicle according to a second pattern associated with the first pattern, during a second duration associated with the first duration; receive the captured images of the side of the vehicle from the first roadside imaging device; compute a vehicle occupancy of the vehicle by, in each of the captured images: determining one or more regions of interest of the vehicle in each of the captured images; determining the vehicle occupancy as a number of visible occupants in the one or more regions of interest; and determining a most likely number of occupants based on each determined vehicle occupancy; and transmit the vehicle occupancy to a monitoring system.

In some embodiments, the first roadside imaging device is positioned to extract data for different perspectives of occupants as the vehicle travels horizontally across the field of view; and each of the images captured by the first roadside imaging device include different perspectives of the side of the vehicle.

In some embodiments, the processor is configured to compute a yaw angle relative to a horizontal axis perpendicular to the expected direction of vehicle travel, wherein the images captured by the first roadside imaging device include the different perspectives of the side of the vehicle based on the first yaw angle.

In some embodiments, the processor, to compute the vehicle occupancy of the vehicle, is configured to: discard uninteresting regions of the plurality of captured images to generate subsets of the plurality of captured images; and determine the number of visible occupants based on determining one or more regions of interest of the vehicle in the respective subset of the plurality of captures images.

In some embodiments, the first roadside imaging device, the first roadside light emitter, and the vehicle detector are attached to a mobile roadside structure.

In some embodiments, the system has a second roadside imaging device, above the first roadside imaging device, the second roadside imaging device having a second field of view of a second lane of the road, the second lane being further from the first roadside imaging device than a first lane of the road, the second field of view incident on a side of a further vehicle when the further vehicle is in the second lane within the second field of view; a second roadside light emitter adjacent to the road and emitting light towards vehicles in the second field of view; wherein the processor is further configured to: receive another signal from the vehicle detector indicating that the further vehicle is within or proximate, relative to the expected direction of vehicle travel, to the second field of view; command the second roadside light emitter to emit light according to a third pattern for a third duration; command the second roadside imaging device to capture additional images of the side of the further vehicle according to a fourth pattern associated with the third pattern, during a fourth duration associated with the third duration; receive the additional captured images of the side of the further vehicle from the second roadside imaging device; compute a vehicle occupancy of the further vehicle by, in each of the additional captured images by: determining one or more regions of interest of the further vehicle in each of the additional captured images; determining the vehicle occupancy of the further vehicle as a number of visible occupants of the further vehicle in the one or more regions of interest of the further vehicle; and determining a most likely number of occupants of the further vehicle based on each determined vehicle occupancy of the further vehicle; and transmit the vehicle occupancy of the further vehicle to the monitoring system.

In some embodiments, the first field of view and the second field of view overlap, and the processor is further configured to: determine the one or more regions of interest of the vehicle in the one or more additional captured images; determine a further number of visible occupants of the vehicle in the one or more additional captured images in the one or more regions of interest; and determine the most likely number of occupants of the vehicle based on each determined vehicle occupancy and each determined further number of visible occupants.

In some embodiments, the processor is further configured to: monitor, over time, a plurality of signals from the roadside vehicle detector to determine an expected vehicle speed of the vehicle; and adjust one or more parameters of the first roadside imaging device or the first light emitter into a determined optimal configuration for capturing vehicles travelling the expected vehicle speed.

In some embodiments, the processor is further configured to: monitor, over time, a plurality of signals from the roadside vehicle detector to determine an expected vehicle speed of the vehicle; and determine the first pattern and the first time window based on the expected vehicle speed.

In some embodiments, the system has a sensor for detecting ambient conditions; wherein the processor is further configured to: receive ambient condition information from the sensor; determine an optimal configuration for the imaging device based on the received ambient condition; and transmit a further command signal to the imaging device capture images according to the optimal configuration.

In some embodiments, the light emitter is an LED emitting infrared or near infrared light, the first pattern is 120 pulses per second, and the regions of interest are a rear side window and a front side window.

In accordance with another aspect, there is provided a method for detecting occupancy of a vehicle travelling in an expected direction of travel along a road. The method involves receiving a signal indicating that the vehicle is within or proximate, relative to the expected direction of vehicle travel, to a first field of view of a first roadside imaging device; commanding a first roadside light emitter to emit light according to a first pattern for a first duration; commanding the first roadside imaging device to capture images of a side of the vehicle according to a second pattern associated with the first pattern, during a second duration associated with the first duration; receiving the captured images of the side of the vehicle from the first roadside imaging device; computing a vehicle occupancy of the vehicle by, in each of the captured images: determining one or more regions of interest of the side of the vehicle in each of the captured images; determining the vehicle occupancy in the one or more regions of interest; and determining a most likely number of occupants based on each determined vehicle occupancy; and transmitting the most likely number of occupants to a monitoring system.

In some embodiments, the method involves discarding uninteresting regions of the plurality of captured images to generate subsets of the plurality of captured images; and determining the number of visible occupants based on determining one or more regions of interest of the vehicle in the respective subset of the plurality of captures images.

In some embodiments, the one or more regions of interest include at least one of a rear side window and a front side window.

In some embodiments, each of the captured images includes the side of the vehicle at different perspectives based on a yaw angle which encourages image variation.

In some embodiments, the method involves commanding a second roadside imaging device to capture additional images of the side of the vehicle from a second field of view according to a fourth pattern associated with the first pattern, for a fourth duration associated with the first duration; receive the additional captured images of the side of the vehicle from the second roadside imaging device; wherein computing the vehicle occupancy of the vehicle further comprises, for each of the additional captured images: determining one or more additional regions of interest of the vehicle; determining the vehicle occupancy of the vehicle in the additional one or more regions of interest of the vehicle; and determining the most likely number of occupants of the vehicle based on the each of the number of visible occupants and the further number of visible occupants; and transmitting the vehicle occupancy of the further vehicle to the monitoring system.

In some embodiments, the method involves receiving a signal indicating that a further vehicle is within or proximate, relative to the expected direction of vehicle travel, to the second field of view; commanding a second roadside light emitter to emit light according to a third pattern for a third duration; commanding the second roadside imaging device to capture additional images of a side of the further vehicle according to a fourth pattern associated with the third pattern, during a fourth duration associated with the third duration; receiving the additional captured images of the side of the vehicle from the first roadside imaging device; computing a vehicle occupancy of the further vehicle by, in each of the additional captured images: determining one or more further regions of interest of a side of the further vehicle in each of the additional captured images; determining the further vehicle occupancy as a number of visible occupants in the one or more further regions of interest; and determining a most likely number of occupants of the further vehicle based on each determined further vehicle occupancy; and transmitting the most likely number of occupants of the further vehicle to the monitoring system.

In some embodiments, the method involves computing a correction parameter and providing visual guidance using augmented reality avatars on a display device.

In some embodiments, the method involves monitoring, over time, a plurality of signals from the roadside vehicle detector to determine an expected vehicle speed of the vehicle; and adjusting one or more parameters of the first roadside imaging device or the first light emitter into a determined adjusted configuration for capturing vehicles travelling the expected vehicle speed.

In some embodiments, the method involves monitoring, over time, a plurality of signals from the roadside vehicle detector to determine an expected vehicle speed of the vehicle; and determining the first pattern and the first time window based on the expected vehicle speed.

Many further features and combinations thereof concerning embodiments described herein will appear to those skilled in the art following a reading of the instant disclosure.

DESCRIPTION OF THE FIGURES

In the figures.

DETAILED DESCRIPTION

Figure 1:
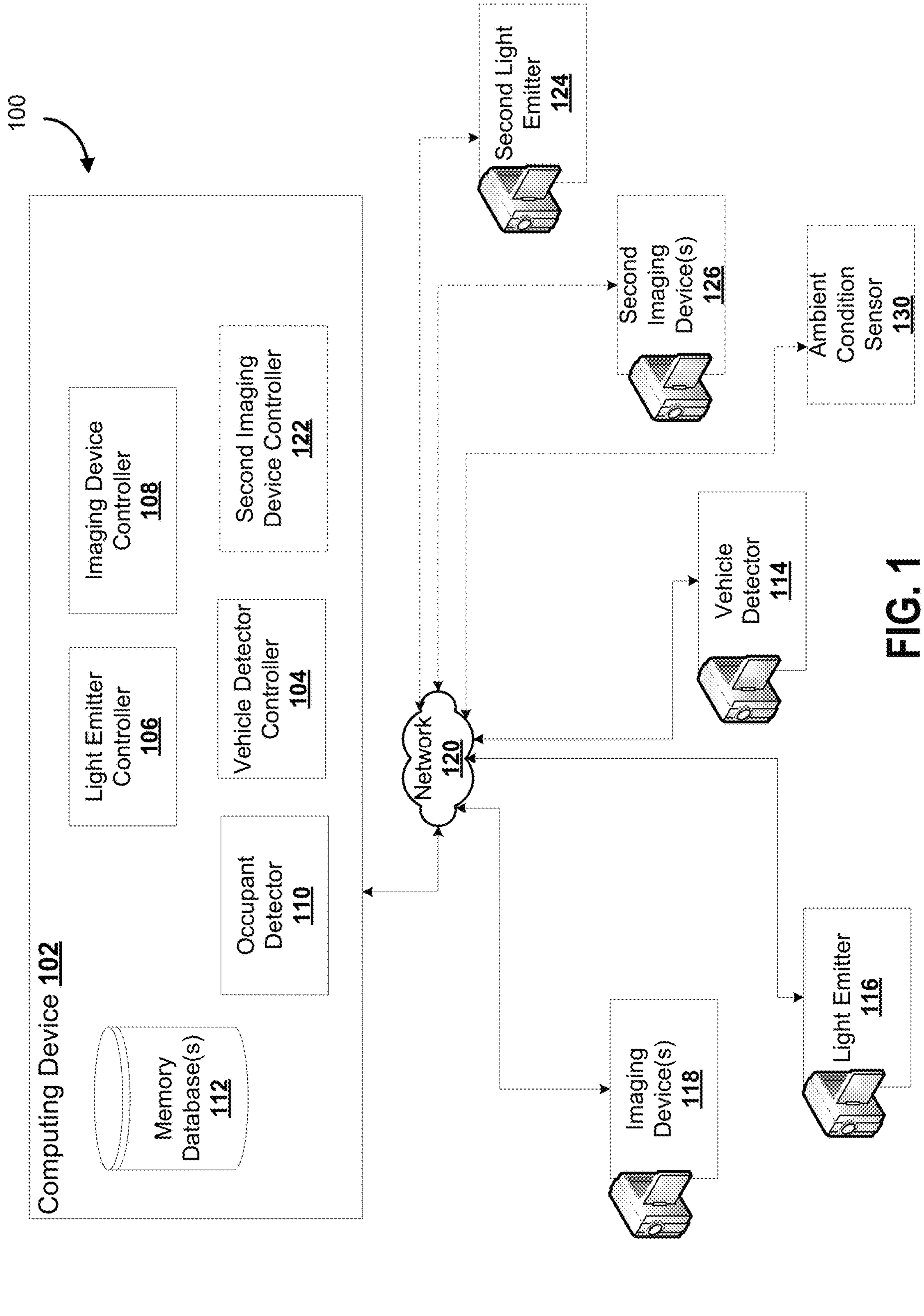
FIG. 1 is a network diagram of a system for vehicle occupancy detection, in accordance with example embodiments.

Embodiments described herein provide computer vision based Vehicle Occupancy Detection (VOD) systems and methods. The described systems can include a road-side unit (IRSU) with an imaging device that captures successive images of vehicles moving along in a lane on a highway or road. The road-side unit is configured to capture a plurality of images of one or more vehicles travelling along a lane of a road. The road side unit can capture images from a fixed perspective. The successive images are, for each vehicle, analyzed to determine a likely vehicle occupancy. The system may achieve high accuracy, in some instances above 95% performance, despite processing images received from a fixed perspective imaging device on the side of the road. As a result of capturing multiple images from the fixed perspective, and further as a result of the images being captured from a roadside position, the images between installations may allow for more robust training, and portable occupancy detection approaches, which are adaptable to a variety of operating environments. The use of the multiple images being captured from a fixed roadside position also allows the system to generate a robust estimation of the vehicle occupancy without the need for expensive or overhead systems that are difficult to install. The roadside system may require fewer parts, have lower maintenance costs, and be easier to deploy.

Furthermore, and as a result of the unit being roadside, the system may operate with enhanced privacy without the need to transmit data remotely. In some embodiments, the described system may permit rapid set-up or installation, e.g., in less than 1 hour per site, without the need for further post-installation site specific training or tuning. The described system may further be a stationary system, or the system can be a mobile system capable of being reinstalled or configured for various sites.

In example embodiments, the system has a roadside unit with a light detection and ranging (LIDAR) unit. In example embodiments, the roadside unit can determine whether a vehicle is in an upstream portion of the lane, and an infrared light emitter to illuminate vehicle occupants through a region of interest of the vehicle (e.g., a windshield). The infrared light emitter may overcome, at least to some degree, window tint and sun-related over or under exposure. For example, a difficult lighting condition tends to arise in the daytime due to interference from the sun, white washing images. The system is capable of adjusting the imaging device parameters (e.g., number of pictures taken for each vehicle, camera exposure time, camera frame rate) and the infrared light emitter parameters (e.g., illumination intensity) based on measured ambient conditions (e.g., measured with ambient environmental sensors attached to the system, or retrieved from a network) in order to maximize the quality of the image acquisition, which in turn leads to higher overall accuracy.

The system further comprises an infrared camera to capture images of the vehicle (and vehicle occupants), the captured images capturing at least some of the light emitted by the infrared light emitter and reflected by the vehicle or vehicle occupants. Optionally, the system can include a second imaging device (and corresponding infrared illumination source) to capture vehicle occupancy in a further lane of the road or highway (e.g., to detect occupancy in a second lane of a highway). Optionally, the system may include an imaging device for capturing vehicle license plates (LPR).

In example embodiments, a processor running VOD software determines a front and a rear occupancy of the vehicle from the images, and securely transfers images and metadata to a tolling system. In example embodiments, the processor may determine or identify violating vehicles' license plates, and further transmit the identified license plates to the tolling system. The system can have rules for defining parameters for violations, for example.

The proposed system may be able to operate, unattended, under all weather conditions. Operation of the system may be transparent to road users, as the roadside unit does not visually distract the driver, or impede a line of sight needed by the driver to navigate traffic.

To maintain privacy, vehicle or occupant data can be filtered and removed so that it is not retained by the system or transmitted to a cloud-based back-end service: only data related to suspected violations can be securely uploaded to the tolling systems before local deletion. License plate recognition is implemented by software of the system, with installation, maintenance and consistent configuration at every site.

The system may operate with a single imaging device adjacent to the road, as compared to a plurality of imaging devices proximate to the road, or overhead imaging devices and so forth. The single imaging device system requires taking successive high-speed images as the vehicle passes the field of view of the imaging device. Subsequently, the images are analyzed to determine both front and rear occupancy. This solution has the advantage of simplifying the system, introducing less redundancy, which in turn improves accuracy and significantly reduces the overall cost of the system.

The described system may be relatively simple to adjust or implement in a variety of environments as a result of the relatively fixed geometry associated with the single configuration. In training the system prior to installation, a plurality of images are captured with the single imaging device in a calibration unit from multiple sites, each site experiencing a variety of weather phenomena (e.g., rain, snow, etc.), and capturing a variety of vehicle occupant behaviors (e.g., turned head, wearing face coverings, etc.). Training the system can comprise labelling the training images, and subsequently training a machine learning data model with the captured training images. The machine learning model learns to detect vehicle occupancy based on the training images. As the training images are captured in an environment which is replicated during installation, namely the single image camera geometry, and as the single camera implementation requires far fewer variables to adjust relative to a multi-camera implementation (e.g., only one pitch, and yaw of a single camera to adjust, which does not require complicated tuning to permit inter-camera image integration), the system may replicate the trained machine learning model on each system operating in a new or different site, without the need for extensive retraining or tuning of the machine learning model. Alternatively stated, the trained machine learning model may be robust and portable to various sites, in part as a result of the consistency of the sites (e.g., all roads have lanes), and in part as a result of the complexity-reducing configuration of the system (e.g., the system uses a single imaging device which captures multiple images).

In an illustrative example, the training process may determine recommended configurations of the system, including a height that is relative to the road, relative distance (horizontal and vertical) between the system components (e.g., any of the imaging device, illumination device, and LIDAR), and a pitch, yaw and roll of the system components. In example embodiments, the recommended configuration may include an error parameter, an amount to which the described parameters may be incorrect while maintaining an adequate performance level. For example, the system may permit geometry variations of up to 15 cm for the height and x-y coordinates of the system components, and up to 10 degrees of variation in the pitch, yaw and roll of the system components.

Continuing the example, once on site, the system receives different measurements: (1) a distance to the target lane (e.g., a distance from the intended mounting location of the unit to the centerline of the lane), (2) a width of the target lane, and (3) a height reflective of the difference in height of the ground between the unit mounting location and the target lane (e.g., in case there is a slope from the target lane to the mounting location).

During installation, three measurements are entered into a user interface to the system, and a processor of the system computes a required geometry of each component of the system to implement the trained machine learning model with an acceptable degree of accuracy. Because the geometry for any given site is typically a small variation relative to the training geometries (e.g., most road lane widths and heights are relatively fixed). As a final step, the imaging device parameters (e.g., a camera zoom, gain, etc.) can be adjusted to the recommended level provided by the automated program and locked into position, and the system can then begin operation.

In a diagnostic mode, live images are displayed on a diagnostic computer (laptop) that can be securely connected to the system. If no further adjustment is necessary, the system can begin its operation.

The system may be able to support the capture of high-quality images in rapid succession from closely following vehicles travelling in excess of 200 km/h. The system uses efficient deep neural network software to achieve accuracy and handle difficult situations such as poor weather conditions (e.g., heavy rain, heavy snow, fog), and difficult situations (e.g., children in car seat, heavy tint, etc.).

In example embodiments, the system may be installed on either a roadside post or gantry-mounted. The system may also be deployed in a secure mobile trailer, or other mobile unit, that may be quickly moved from one location to the next for rapid adhoc applications. Each component of the system could also be separately mounted on the mobile unit providing the system high installation flexibility.

In example embodiments, the system can be updated remotely by a control system to enable further training and tuning of the machine learning model. In example embodiments including multiple systems (e.g., multiple roadside units), each system may be updated by the control system.

Reference will now be made to the figures.

FIG. 1 is a network diagram of a system 100 for vehicle occupancy detection, in accordance with example embodiments.

The system 100 includes a computing device 102, a vehicle detector(s) 114, a light emitter(s) 116, imaging device(s) 118 for detecting vehicle occupancy in a first lane on a road and, optionally, second light emitter(s) 124, an ambient condition sensor 130, and second imaging device(s) 126. The second light emitter(s) 124, and the second imaging device(s) 126 may be used to detect vehicle occupancy in a second lane, or to detect a vehicle license plate. The system 100 may require fewer parts and lower maintenance costs as compared to systems which use multiple imaging devices to determine vehicle occupancy in a single lane.

Vehicle detector(s) 114 can be various devices which are capable of detecting the presence of a vehicle at various distances. For example, the vehicle detector(s) 114 may be a laser-based system for detecting vehicles, such as a Light Detection and Ranging system (LiDAR), which both emits light and detects the presence of return light in response to the emitted light reflecting off of a vehicle. According to some embodiments, for example, the vehicle detector(s) 114 may be a radio wave based system, such as Radio Detection and Ranging (RADAR), or a mechanical, micro-electromechanical system (MEMS), solid-state or hybrid LiDAR unit.

Vehicle detector(s) 114 may include multiple instances of devices capable of detecting the presence of the vehicle. For example, the vehicle detector(s) 114 may include two separate LiDAR units, which allows for greater robustness of the system as there is more return light to be analyzed.

Vehicle detector(s) 114 may be configured to detect one or more vehicles at various distances. For example, a LiDAR vehicle detector(s) 114 can be configured to ignore any readings representative of objects more than 10 m away. In some embodiments, for example, where the vehicle detector(s) 114 include multiple devices, each of the multiple devices can be configured to detect vehicles at different distances. Alternatively, the multiple devices may be used redundantly to detect vehicles a single distance away from the vehicle detector(s) 114.

The vehicle detector(s) 114 may be modified or augmented to withstand ambient conditions. For example, the vehicle detector(s) 114 may be weatherproofed with various materials, such as plastic covering or coatings, to protect against rain, snow, dust, insects and so forth.

The light emitter(s) 116 can include various devices capable of emitting specific ranges of light at specific frequencies (i.e., patterns) for specific durations. For example, the light emitter(s) 116 can be a strobe light configured to emit a white light at a specific frequency based on strobe light cool down limitations.

In an illustrative example, light emitter(s) 116 includes an infrared light-emitting diode (LED) configured to emit infrared light in the range of 750 nm to 1300 nm, or as another example, a range of 850 nm+/−10 nm. Advantageously, infrared light emitter(s) 116 may be able to illuminate the inside of a vehicle, overcoming window tint and sunlight exposure.

Continuing the example, the infrared LED light emitter(s) 116 may be able to overcome cool down limitations of strobe lights, and burst infrared light at a rate of 120 pulses a second. Various frequencies of pulsing are contemplated. In some embodiments, for example, the infrared LED light emitter(s) 116 may be configured to, or remotely controlled to dynamically change the pattern of light emission. For example, the infrared LED light emitter(s) 116 may pulse at different frequencies in response to being controlled, based on the detected speed of a detected vehicle speed (e.g., light may be emitted faster in response to a higher vehicle speed being detected).

Varying types and amounts of light emitter(s) 116 may be used in system 100. For example, in the shown embodiment in FIG. 2, the light emitter(s) 116 includes the strobe light emitter(s) 116-1. In the embodiment shown in FIG. 3, the light emitter(s) 116 includes the first and second occupant light emitter(s) 116-1.

Imaging device(s) 118 (hereinafter referred to as passenger imaging devices) can include any type of imaging device capable of capturing the light emitted by the light emitter(s) 116. For example, where the light emitter(s) 116 is an infrared light emitter, the imaging device(s) 118 is an infrared imaging device. In some embodiments, for example, the imaging device(s) 118 may be adapted for the specific frequency of light being emitted by light emitter(s) 116. The imaging device(s) 118 may be a high speed imaging device, capable of taking successive images within a short period of time.

The imaging device(s) 118 may be configured (as described herein) to capture one or more images of one or more vehicles within their field of view, when the vehicles are detected by the vehicle detector(s) 114. The imaging device(s) 118 may be configured to capture multiple images (i.e., a plurality of images) upon receiving a control command to start capturing images. For example, the imaging device(s) 118 may, in response to receiving a control command, capture 5 successive images at 90 frames per second (FPS).

The imaging device(s) 118 are positioned relative to the road to capture images of at least the side of the vehicle. In example embodiments, the imaging device(s) 118 are positioned relative to the road to capture images of various combinations of the front of the vehicle, the side of the vehicle, the rear of the vehicle, and so forth. For example, the imaging device(s) 118 may capture one image of the front and side of the vehicle, three images of the side of the vehicle, and one image of the rear and side of the vehicle.

Optionally, the system 100 may include the second light emitter(s) 124, and the second imaging device(s) 126, similar to light emitter(s) 116 and imaging device(s) 118. The second light emitter(s) 124, and the second imaging device(s) 126 may be positioned relative to the road similar to the light emitter(s) 116 and the imaging device(s) 118 but directed to capture one or more images of the rear of the vehicle to include a license plate of the detected vehicle. In example embodiments, the second light emitter(s) 124, and the second imaging device(s) 126 are similar to light emitter(s) 116 and imaging device(s) 118, positioned relative to the road to capture images of the side of a further vehicle travelling in a second lane.

Optionally, the system 100 may include the ambient condition sensor 130, which detects ambient conditions such as sunlight intensity, temperature, moisture, humidity, rainfall, snowfall, and so on. In example embodiments, the ambient condition sensor 130 includes a variety of sensors for various ambient conditions.

Referring now to computing device 102, the computing device 102 may be configured to communicate command signals to the vehicle detector(s) 114, the light emitter(s) 116, the imaging device(s) 118, the second light emitter(s) 124, second imaging device(s) 126, and the ambient condition sensor 130, and to receive captured images from the imaging device(s) 118 and second imaging device(s) 126 and detected conditions from the ambient condition sensor 130. The computing device 102 may be configured to operate with the Linux operating system.

In example embodiments, the computing device 102 is in a housing (not shown), and is also used to transmit power to one or more of the vehicle detector(s) 114, the light emitter(s) 116, the imaging device(s) 118 the second light emitter(s) 124, the imaging device(s) 118 and the second imaging device(s) 126. For example, the computing device 102 may power the imaging device(s) 118.

The computing device 102 may include various combinations of a vehicle detector controller 104, a light emitter controller 106, an imaging device controller 108, an occupant detector 110, a database(s) 112, and, optionally, a second imaging device controller 122.

The vehicle detector controller 104 can be configured to control the vehicle detector(s) 114 through a series of command signals. The command signals are interpretable by the vehicle detector(s) 114, and can include instructions to control various operating features of the vehicle detector(s) 114. For example, the command signals may adjust a threshold indicative of detection of a vehicle (e.g., certainty rate must be over 90%) used by the vehicle detector(s) 114 to determine whether a vehicle is detected. The command signals may control the distance to which the vehicle detector(s) 114 operate (e.g., vehicles that are more than 10 m away from the vehicle detector(s) 114 will be ignored), the frequency and timing of operation of the vehicle detector(s) 114 (e.g., pulse light at a first frequency to detect a vehicle), and so forth.

In a non-limiting example embodiment, the vehicle detector controller 104 may transmit configuration characteristics to the vehicle detector(s) 114, allowing an operator to change the operation of the vehicle detector(s) 114 through the use of the computing device 102. For example, where the vehicle detector(s) 114 is mounted at a first height, the vehicle detector controller 104 may transmit a calibration parameter to adjust detection of vehicles by the vehicle detector(s) 114 based on the first height. Continuing the example, the vehicle detector(s) 114 may be configured to expect vehicles at the detection distance to be near or close to the top of a field of view of the vehicle detector(s) 114.

In some embodiments, for example, the vehicle detector controller 104 may transmit command signal to the vehicle detector(s) 114 to detect the speed of a vehicle. The vehicle detector(s) 114 may, in response, provide the vehicle detector controller 104 with two detections of the same car at different instances in time, allowing for the speed to be interpolated. In example embodiments, the vehicle detector(s) 114 is continuously monitoring detected vehicles in its field of view, and directly computes the speed of the detected vehicles and relays the same to the vehicle detector controller 104.

The light emitter controller 106 is configured to control the light emitter(s) 116 through a series of command signals. The command signals are interpretable by the light emitter(s) 116, and can include command signals to control the type of light emitted (e.g., emitted light should be 800 nm), command signals to control the power used by the light emitter(s) 116 (e.g., increase or decrease the intensity of the emitted light), the frequency and timing of operation of the light emitter(s) 116 (e.g., pulse light at a first frequency, for a first duration, etc.), and so on.

In non-limiting example embodiments, the light emitter controller 106 may transmit configuration characteristics to the light emitter(s) 116, allowing an operator to change the operation of the light emitter(s) 116 through the use of the computing device 102. For example, where the light emitter(s) 116 is capable of adjusting a field of view (e.g., such as being able to rotate around a first axis), the light emitter controller 106 may transmit a command signal to adjust the field of view (e.g., a command signal to swivel the light emitter(s) 116) of the light emitter(s) 116.

The imaging device controller 108 is configured to control how the imaging device(s) 118 capture one or more images through one or more command signals. The command signals are interpretable by the imaging device(s) 118, and can include command signals to control a frequency of capturing images (e.g., capture two images per second) or the timing of operation of the imaging device(s) 118 (e.g., capture images at this time, where the detected vehicle is expected to be within the imaging device(s) 118 field of view, for this duration), alter or adjust the operating focal distance (e.g., focus is directed towards the area between lanes within a road), the exposure settings (e.g., the aperture, ISO and shutter speed settings), and so forth.

Each of the vehicle detector controller 104, the light emitter controller 106, and the imaging device controller 108 may be configured to transmit command signals to the respective devices dynamically (e.g., in real time), at intervals, upon configuration, or some combination of the aforementioned. For example, the vehicle detector controller 104 may transmit command signals to the vehicle detector(s) 114 upon powering on of the system 100, and subsequently transmit command signals to adjust a distance detection dynamically in response to changing ambient conditions.

The occupant detector 110 is configured to receive the plurality of images from the imaging device(s) 118 (and possibly second imaging device 126) and determine a number of occupants in the detected vehicle (alternatively referred to as a vehicle occupancy). The occupant detector 110 may be a machine learning model trained to determine the vehicle occupancy based on roadside images.

The occupant detector 110 may further output the determined vehicle occupancy upon determination. For example, the occupant detector 110 may output the determined vehicle occupancy to a tolling system, which tolls individuals based on the number of occupants in a car. In a non-limiting embodiment, the occupant detector 110 may output the determined vehicle occupancy and the determined lane to a vehicle tolling system, which tolls individuals based on whether a vehicle occupancy complies with the occupancy requirements for the specific lane.

The occupant detector 110 may also coordinate or control the vehicle detector controller 104, the light emitter controller 106, and the imaging device controller 108. For example, the occupant detector 110 may make determinations as to the relative offsets between the operation of light emitter(s) 116 and the imaging device(s) 118, and relay the required offsets to the light emitter controller 106 and the imaging device controller 108, respectively.

According to example embodiments, the vehicle detector controller 104, the light emitter controller 106, the imaging device controller 108 and the second imaging device controller 122 may be located within the respective unit being controlled, and not within the computing device 102. For example, the vehicle detector controller 104 may be integrated within the vehicle detector(s) 114 and pre-configured with operational settings.

Continuing the example, some or all of the vehicle detector controller 104, the light emitter controller 106, the imaging device controller 108 and the second imaging device controller 122 may be interconnected with one another and relay command signals between each other. For example, the vehicle detector controller 104 which is integrated within the vehicle detector(s) 114 may receive command signals from the occupant detector 110, and relays the command signals to a light emitter controller 106 within a light emitter(s) 116 directly.

Optionally, the computing device 102 may include a sensor health monitor (not shown), which monitors the relative health of the sensor. For example, the sensor health monitor may notice a decrease in performance by the vehicle detector(s) 114 based on usage, and so forth.

In response to determining sensor deterioration, the sensor health monitor may be configured to provide a calibration parameter to any one of the components of the system 100. For example, in response to determining light emitter(s) 116 deterioration, the sensor health monitor may instruct the light emitter controller 106, occupant detector 110, or imaging device controller 108 to adjust the operation of the respective components.

The computing device 102 and the vehicle detector(s) 114, light emitter(s) 116, imaging device(s) 118, second light emitter(s) 124, the ambient condition sensor 130, and the second imaging device(s) 126 are interconnected (e.g., transmit or receive command signals) by way of the communication network 120. Communication network 120 may include a packet-switched network portion, a circuit-switched network portion, or a combination thereof. Communication network 120 may include wired links, wireless links such as radio-frequency links or satellite links, or a combination thereof. Communication network 120 may include wired access points and wireless access points. Portions of communication network 120 could be, for example, an IPV4, IPV6, X.25, IPX or similar network.

Portions of network 120 could be, for example, a GSM, GPRS, 3G, LTE or similar wireless networks. Communication network 120 may include or be connected to the Internet. When communication network 120 is a public network such as the public Internet, it may be secured as a virtual private network.

In embodiments where the communication network 120 includes wired links, the wired links, similar to the vehicle detector(s) 114, may be weather-proofed with coatings or covering.

The system 100 may be a mobile system for vehicle detection. For example, the system 100 may be capable of being disassembled and moved to another location along a road. In some embodiments, various components of the system 100 may be relocated. Alternatively, the system 100 may be stationary, and fixed to a fixture.

The system 100 may be configured to receive (via query or push mechanism) one or more updated operating parameters via the communication network 120. For example, the system 100 may receive new parameters for calibrating the occupant detector 110, or the imaging device controller 108, and so forth.

Figure 2:
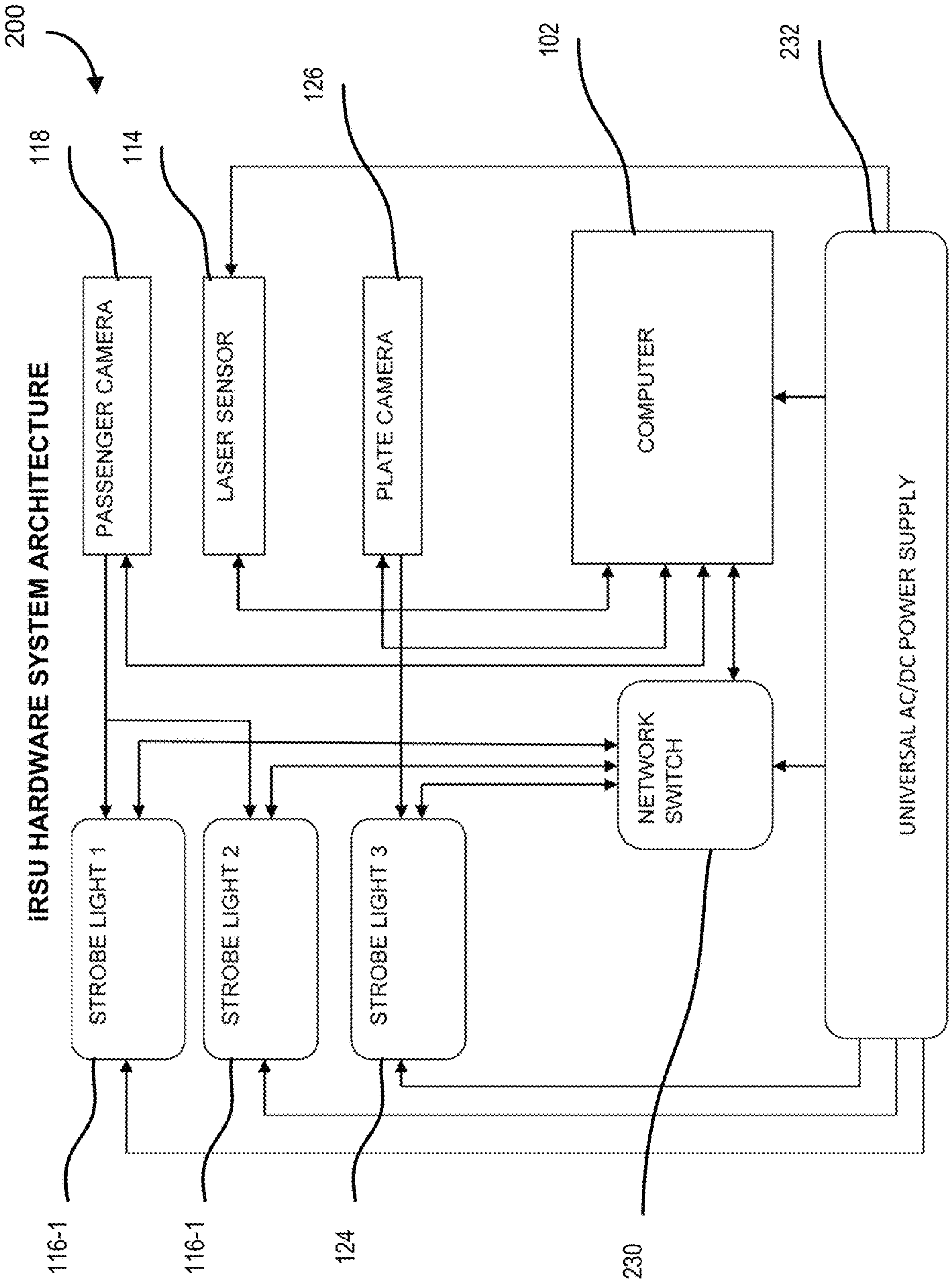
FIG. 2 is an example schematic diagram of a system for vehicle occupancy detection, in accordance with example embodiments.

FIG. 2 is an example schematic diagram 200 of the system of FIG. 1 for vehicle occupancy detection, in accordance with example embodiments.

In the shown example embodiment, the system includes the computing device 102, a laser sensor vehicle detector(s) 114, a strobe light emitter(s) 116-1, a passenger camera imaging device(s) 118, a strobe light second light emitter 124, and a plate camera second imaging device 126.

The example implementation further includes a network switch 230, and a power supply 232 (shown as universal AC/DC power supply). The network switch 230 may be used by the computing device 102 to transmit command signals, and the network switch 230 may use packet switching to receive command signals from the computing device 102 and forward said command signals to the destination component.

The power supply 232 may be one or more devices of various types capable of powering the network switch 230, computing device 102, the laser sensor vehicle detector(s) 114, the strobe light emitter(s) 116-1, the passenger camera imaging device(s) 118, the strobe light second light emitter 124, and the plate camera second imaging device 126. In some embodiments, for example, the power supply 232 includes multiple power supply units (not shown). For example, the power supply 232 may include various types of batteries. The power supply 232 may also be connected to an AC power source, such as a power line in road infrastructure. According to example embodiments, the power supply includes 80-264 VAC, derate output power 10%<90 VAC, and 20%<85 VAC350 & 1000 W: 85-264 VAC, derate output power 10%<90 VAC.

In example embodiments, the power supply 232 includes the ability to convert received power into power as required by the components of the system. For example, the power supply 232 may include a universal AC/DC power supply, capable of converting stored or received AC power into DC power, and providing the DC power as required by the components of the implementation 200.

Figure 3:
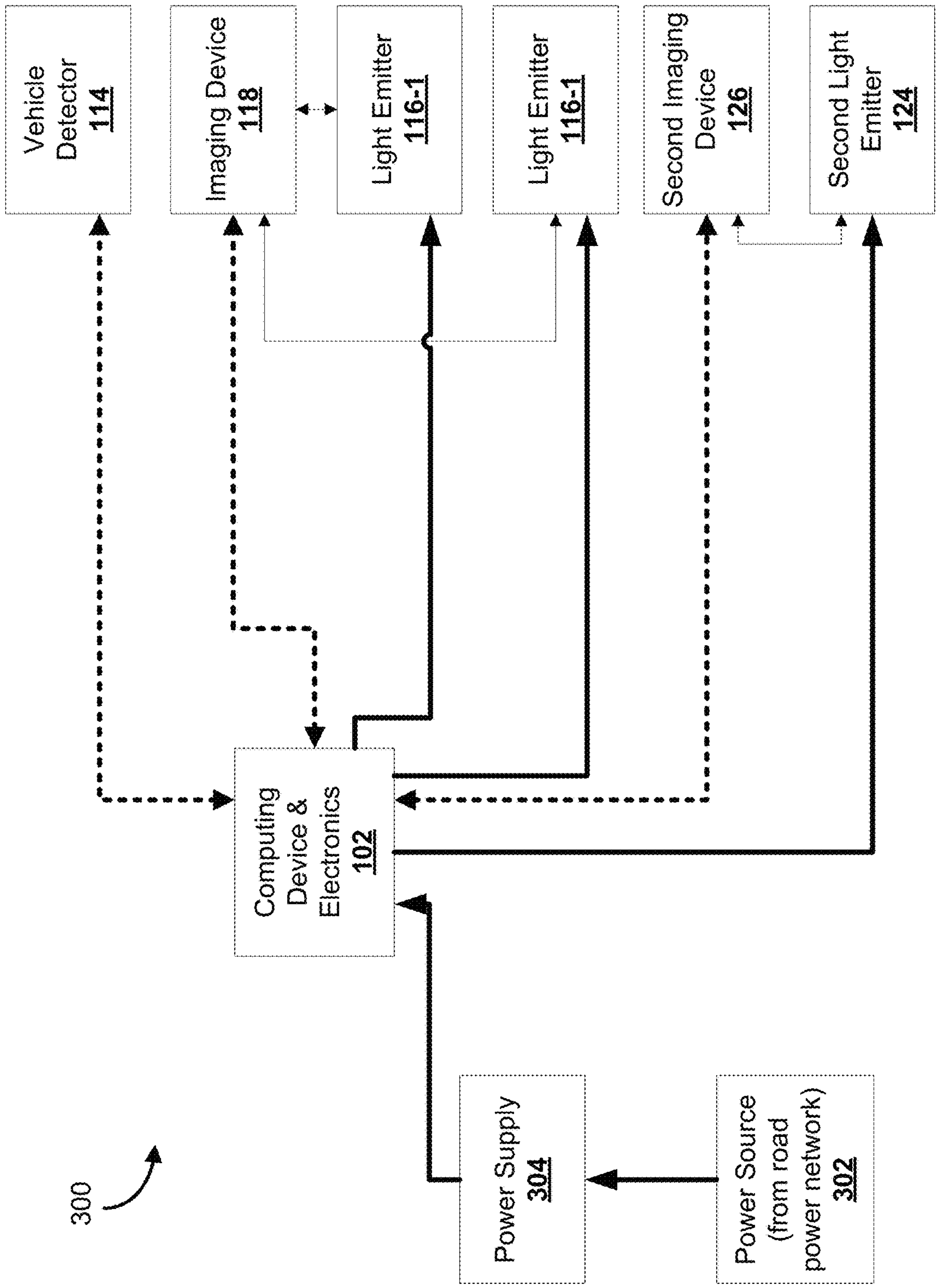
FIG. 3 is another example schematic diagram of a system for vehicle occupancy detection, in accordance with example embodiments.

FIG. 3 is another example schematic diagram 300 of the system for vehicle occupancy detection of FIG. 1, in accordance with example embodiments. In FIG. 3, the power source 302 is a power supply line incorporated into road infrastructure, such as the power supply line which provides power to roadside signage.

Power supply 304, similar to power supply 232, may be configured to covert the power received from the source 302 into a form usable by the components of the system 100. For example, the power supply 304 may provide power to the computing device 102, which may in turn include additional electronics for providing power to one or more of the LiDAR vehicle detector(s) 114, the light emitter(s) 116-1, the imaging device(s) 118, the second light emitter 124, and the second imaging device 126.

In the shown embodiment, the computing device 102 is used as a conduit to provide power to the light emitter(s) 116-1, and the second light emitter 126.

According to some embodiments, for example, in the diagram 300, the computing device 102 sends power and command signals to the vehicle detector(s) 114, the imaging device(s) 118, and the second imaging device 126 which include command signals for the light emitter(s) 116-1 and second light emitter 124. Upon receipt of the command signals, the vehicle detector(s) 114, the imaging device(s) 118, and the second imaging device 126 determine which command signals are intended for the light emitter(s) 116-1 and second light emitter 124, and relay the same to the respective devices. Alternatively stated, the command signals transmitted by computing device 102 may be intended to be relayed, via the imaging devices, to the light emitters.

In non-limiting example embodiments, the computing device 102 is configured to provide command signals to the vehicle detector(s) 114, the imaging device(s) 118, and the second imaging device 126, which in turn determine or generate command signals for the respective light emitter(s) 116-1 and second light emitter 124.

The vehicle detector(s) 114, the imaging device(s) 118, and the second imaging device 126 may include onboard computing devices, which implement the functions of the vehicle detector controller 104, and the light emitter controller 106, and receive command signals from the occupant detector 110.

According to example embodiments, the below table shows an example configuration of the system 100:

| Attribute | Description |
|---|---|
| Dimensions: | Length ≈ 1.20 m<br>Width ≈ 2 m<br>Height ≈ 2 m<br>The sensors and light emitters on the system 100 can be fully adjustable for height, and relative position and angle. The final geometry can be standardized. |
| Weight: | 60-70 kg |
| Ground attachment: | The system 100 may use lockable casters. System 100 may have the ability to be (semi-)permanently secured to a concrete pad. |

-continued

| Attribute | Description |
|---|---|
| Physical security: | System 100 can include weatherproofed latched panels, or waterproof key access to internal components, or security screws for mounting components such as the light emitter(s) 116, or various combinations thereof. |
| Power: | 80-264 VAC 50-60 Hz single phase<br>1,000 W nominal<br>LED output −10% @ <90 VAC; −20% @ <85 VAC |
| Power Conditioning: | Optional internal surge protection and UPS depending upon the quality and reliability of the power supply. UPS intended to power the CPU and connectivity, not the LED arrays. |
| Safety Approvals: | IEC60950-1 CB report<br>CSA 22.2No. 60950-1<br>UL60950-1<br>TUV, EN60950-1<br>SEMI F47 |
| Operating Temperature: | −20° C. to +70° C. ambient. Units exposed to bright sunlight might exceed this range internally, and may be monitored. Additional fans or external coasting or other steps may be taken to support higher or lower temperatures. |
| Weatherproofing: | Light emitter(s) 116 and vehicle detector(s) 114 are weatherproofed from the factory, imaging device(s) 118 are housed in weatherproof cases. For production all cables will be weatherproofed, and vents/fans will be designed to support weatherproofed airflow and prevent ingress by dust, insects, etc. |
| Network: | 1 Gb Ethernet for remote and local access (for maintenance, etc.).<br>4G LTE radio built in for use when Ethernet is not available. |
| Network access control: | Local access SSH via Ethernet, with security controls implemented for both local and remote access. |
| Range: | System 100 may be configured for up to 9 m range. This range can be extended with additional IR illumination panel light emitter(s) 116. |
| Image specification: | Images are captured with a high-speed global shutter industrial camera imaging device(s) 118 optimized for near infrared.<br>1920 × 1080 FHD uncompressed<br>120 Hz capture rate, supported by custom IR LED arrays and controllers. |
| Processor: | Ruggedized passively cooled Linux PC rated for outdoor temperatures, and placed in weatherproofed box. |
| On board analysis: | The AI models runs in real-time on a local Linux server, analysing multiple images per vehicle (to more accurately detect occupancy when passengers are occluded by A, B or C pillars. |
| Local storage: | The system 100 may include two 4 Tb SATA drives configured in RAID 1 for robust local storage. Images for violating vehicles (or other vehicles of interest) can be stored locally if broadband network connectivity is not available (of for training/testing data capture). |

Figure 4:
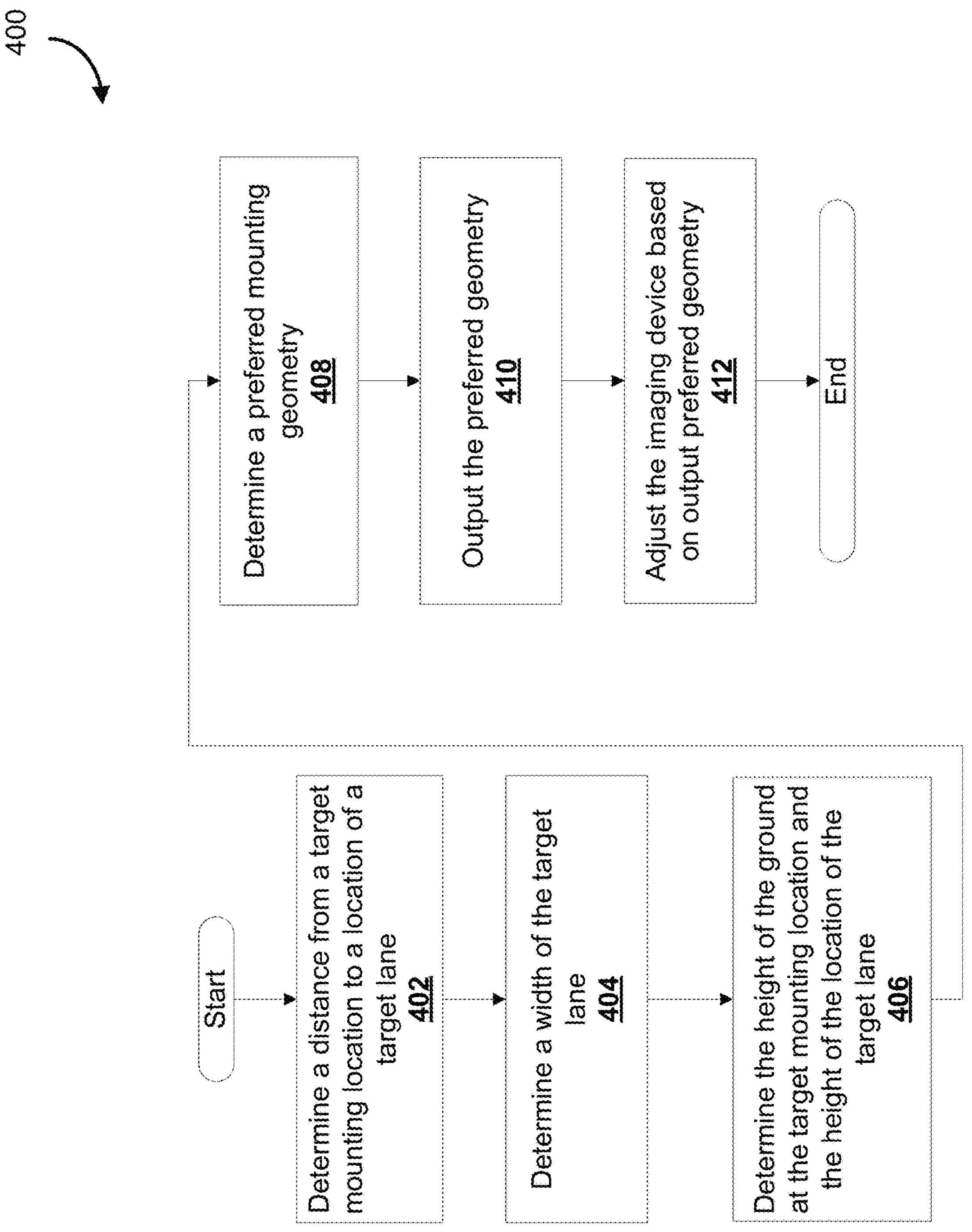
FIG. 4 is a flowchart of an example method for configuring a system for vehicle occupancy detection, in accordance with example embodiments.

FIG. 4 shows an example of method 400 for configuring a vehicle detection system.

At step 402, a distance from the target mounting location to a location of a target lane is determined.

The target mounting location may be determined in part by the road infrastructure available in a particular location. For example, the system for vehicle occupancy detection 100 may be installed on a roadside post or other roadside fixture. In example embodiments, the target mounting location is based on a desired location of a mobile gantry which the system for vehicle occupancy detection 100 is attached. In some embodiments, for example, the target mounting location is based on the traffic observed on the target lane, or the nature of the target lane (e.g., the target location is placed near a high occupancy vehicle (HOV) lane).

A target lane can include one or more lanes of road which are expected to have vehicle traffic and where vehicle occupation is desired to be determined. For example, the target lane may be a lane of a highway. The location of the target lane is a location where a vehicle occupancy is desired to be determined. For example, the location of the target lane may be a location where a high occupancy vehicle (HOV) designated lane begins.

At step 404, a width of the target lane is determined. The width of the target lane may be determined by manually measuring the lanes width. In example embodiments, the width of target lane is determined by taking an image of the target lane and processing the image to determine a width.

At step 406, a height of the ground at the target mounting location and a height of the location of the target lane are determined. For example, where the target lane slopes, and the location of the target lane is uphill of the target mounting location, the difference between the relative heights at the target mounting location and the location of the target lane is determined.

At step 408, a preferred mounting geometry is determined. In example embodiments, the preferred mounting geometry is determined in reference to a base mounting geometry.

Figure 5A:
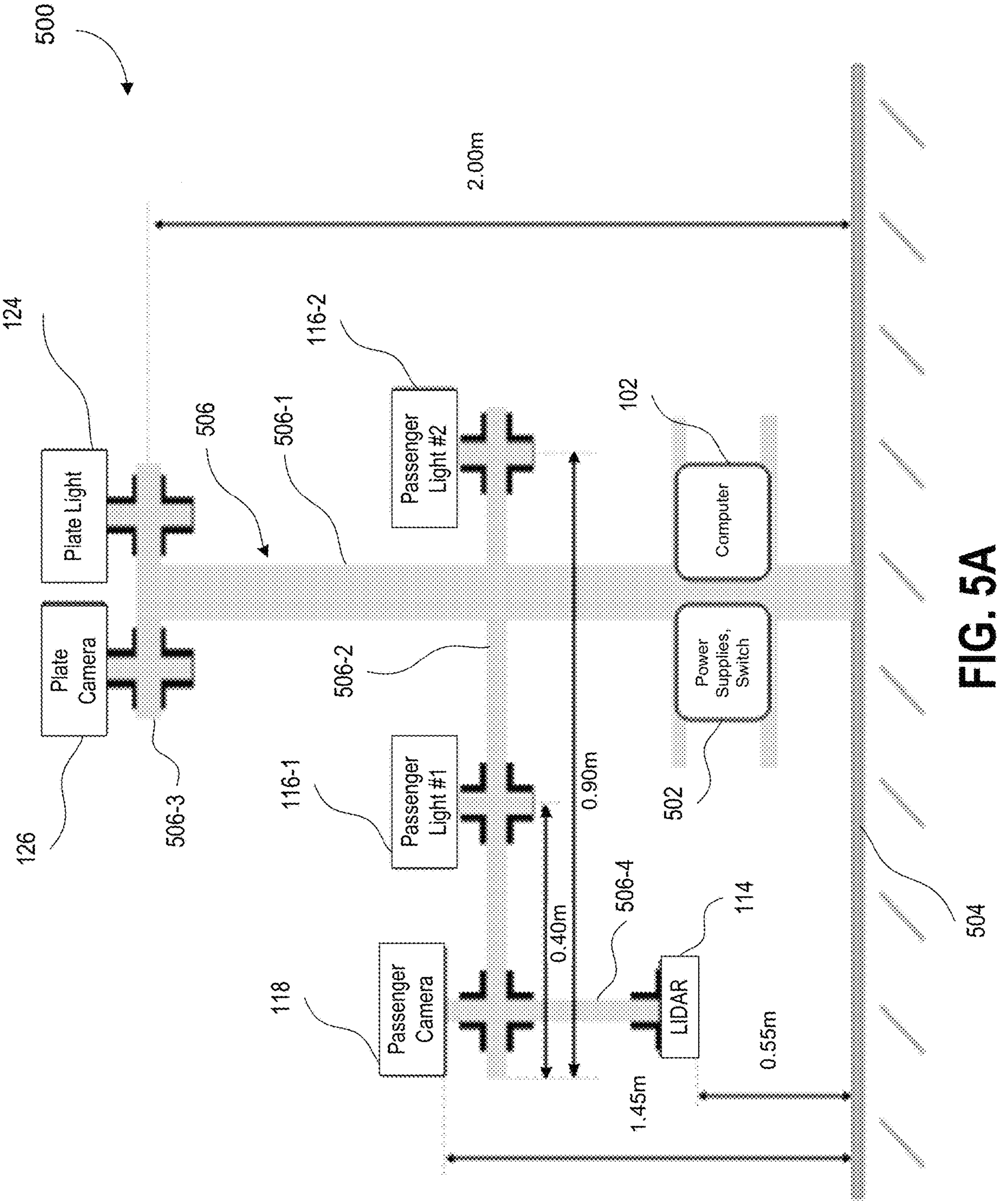
FIG. 5A, is a further example schematic diagram of a system for vehicle occupancy detection, in accordance with example embodiments.

Referring now to FIG. 5A, a diagram of an example configuration 500 of the system 100, mounted according to a preferred mounting geometry, is shown. In example embodiments, the configuration 500 is a preferred mounting geometry, or the configuration 500 may be a base mounting geometry.

Configuration 500 includes the computing device 102, the LiDAR vehicle detector(s) 114, the passenger light emitter(s) 116-1, the passenger camera imaging device(s) 118, the plate camera second light emitter 124, and the plate camera second imaging device 126 of system 100 connected to a mounting device 506. The mounting device 506 may be a variety of geometries, and made of a variety of materials which allow for mounting of devices of system 100. For example, the shown mounting device 506 is shaped at least in part as having a support member 506-1, a first attachment member 506-2, a second attachment member 506-3, and a third attachment member 506-4. Some or all parts of the mounting device 506 may be a mobile gantry, or a roadside fixture. For example, the mounting device 506 may include as support member 506-1 the roadside fixture, and the first attachment member 506-2 and the second attachment member 506-3 may be metal supports passing through the roadside fixture. In another non-limiting embodiment, the system 100 may also be deployed in a secure mobile trailer (not shown) that may be quickly moved from one location to the next for rapid adhoc applications. In example embodiments, the mounting device 506 includes lockable casters for attaching to the various constituent elements or the ground 504.

Network and power interface 502 carries out the functions of the network switch 230 and the power supply 232 of FIG. 2. Network and power interface 502 is similarly connected to mounting device 506.

In the shown embodiment, the LiDAR vehicle detector(s) 114 is shown as being connected to third attachment member 506-4 0.55 [m] above the ground 504.

The passenger light emitter(s) 116-1, and the passenger camera imaging device(s) 118 are shown as being connected to the first attachment member 506-2 1.45 [m] above ground 504. The passenger light emitter(s) 116-1 are separated by a horizontal distance of 0.5 [m] from center to center along the first attachment member 506-2. The passenger light emitter(s) 116-1 is also shown as 0.4 [m] horizontally distant from a first end of the first attachment member 506-2, while the passenger light emitter(s) 116-1 is shown as being 0.9 [m] horizontally distant from the first end of the first attachment member 506-2.

Plate camera second light emitter 124, and plate camera second imaging device 126 are connected to the second attachment member 506-3 at a distance of 2 [m] above the ground.

In example embodiments, installing the system 100 may be rapid as a result of the modularity and fewer amount of parts of system 100, as compared to multi-imaging device systems. For example, in some embodiments the system 100 may be deployed in less than one hour.

Figure 5B:
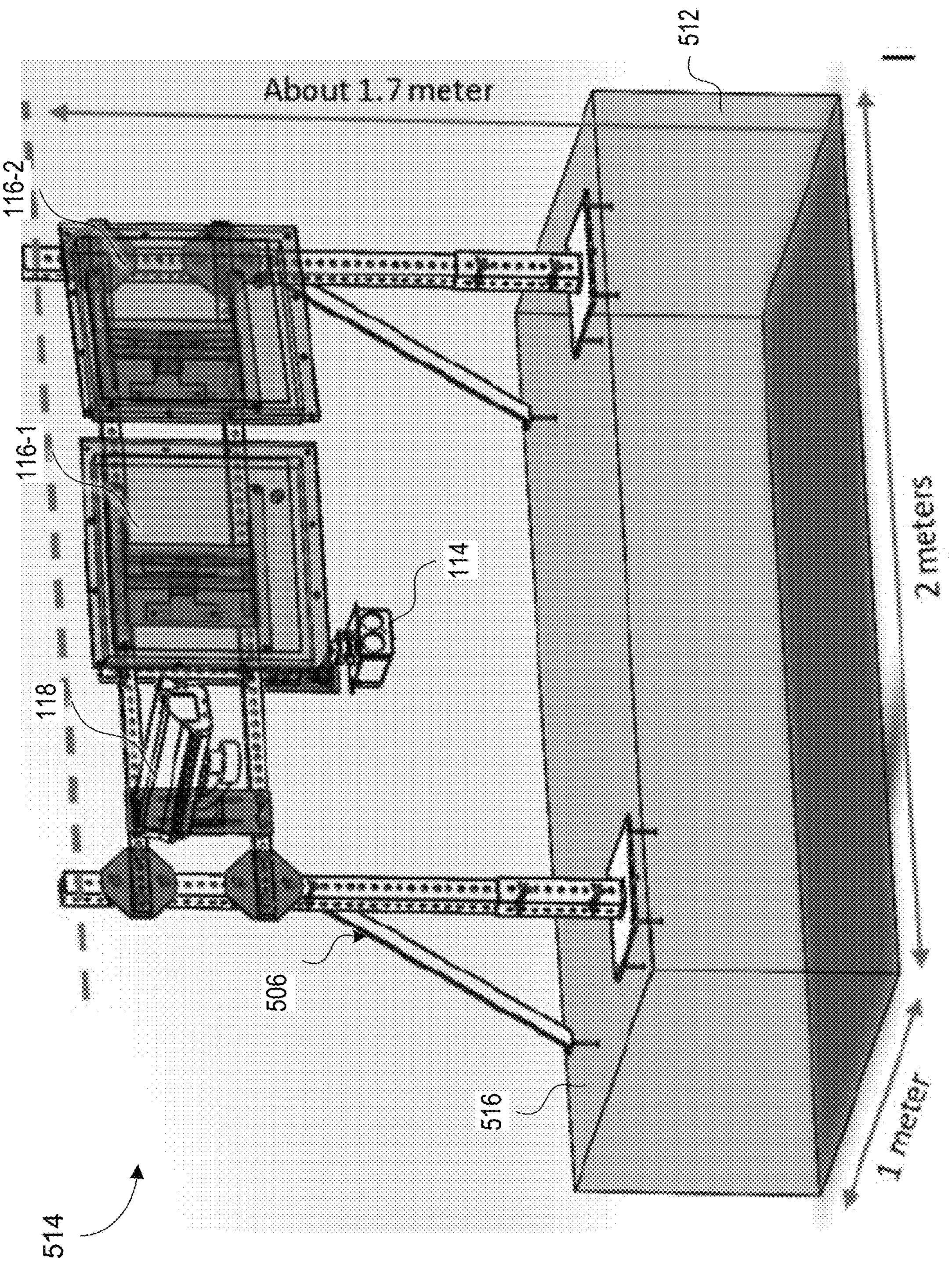
FIG. 5B is a perspective view of an example system for vehicle occupancy detection, in accordance with example embodiments.

FIG. 5B is a perspective view of an example system for vehicle occupancy detection, in accordance with example embodiments;

The example system 514 shown in FIG. 5B has a configuration of the LiDAR vehicle detector(s) 114, the passenger light emitter(s) 116-1, the passenger camera imaging device(s) 118, similar to configuration 500, in that the light emitter(s) 116-1 are upstream of the passenger camera imaging device(s) 118, and the LiDAR vehicle detector(s) 114 is below said components.

The vehicle detector may be upstream of the imaging device if the vehicle detector produces only a one-dimensional lateral measurement of the distance between the station and the vehicle. Examples of such sensors are 1D laser range finders and under-road-pavement sensors (fiber optics, etc.) that record passage of the vehicle at a certain lateral distance from the station, without giving information about the longitudinal position of the vehicle. Other vehicle detectors such as 3D LiDARs do not need to be necessarily placed upstream of the imaging device relative to the traffic direction. Such sensors can be placed in different locations as the physical and geometrical placement plays a less important role, relative to the role of the 3D perception process that detects and tracks the vehicle, and triggers images by the imaging device.

In addition, system 514 includes a concreate pad platform 512, to which mounting device 506 is attached, securing the system in a particular location. The platform 512 is shown to be about 2 meters long and 1 meter wide. The height of the platform 512 can be anywhere between 0 to 60 centimeters from the road surface (compared to the lane of interest). The platform 512 is preferably parallel to the lane of interest and has a flat and level surface 516.

In example embodiments, the platform 512 is a heavy steel structure, or other structure capable of fixing the system 514 to a particular roadside location (i.e., a ground surface adjacent to lanes of a road, which can include a shoulder, a service lane, median strip, or otherwise). A roadside location can also include road portions not directly adjacent to the road segments used for vehicle travel. For example, a roadside location includes, in example embodiments, a road verge next to a road shoulder.

A small electrical cabinet (not shown in the picture) can be installed on surface 516 between the two posts of the structure 506 or elsewhere. According to some embodiments, the cabinet receives power from road infrastructure.

Figure 5C:
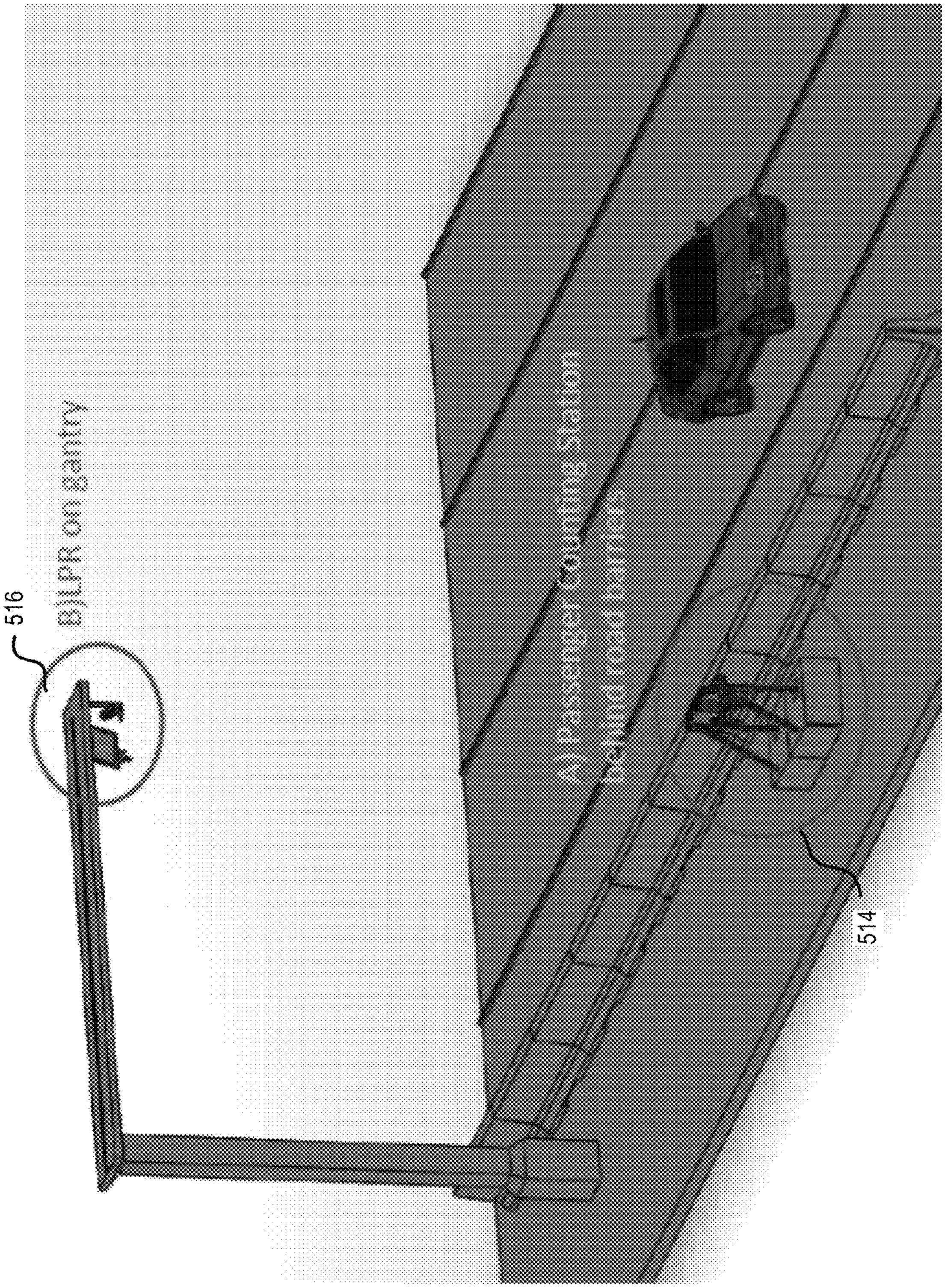
FIG. 5C is a perspective view of the system of FIG. 5B including another imaging device, in accordance with example embodiments.

FIG. 5C is a perspective view of the system 514 of FIG. 5B including another imaging device, in accordance with example embodiments.

In the shown embodiment, the vehicle occupancy detection system 514 is connected with, or controls, an imaging assembly 516 including an imaging device and LIDAR unit mounted above the road. The imaging device and the LIDAR are pointed towards the road so that the imaging device captures images of the license plate of a vehicle as it drives in the direction of traffic. The imaging assembly 516 may, for example, be located 10 to 14 meters upstream of the vehicle occupancy detection system 514, and can be installed on light poles or other roadside fixtures which overhand traffic.

Figure 5D:
FIG. 5D shows a photograph of the system 514 of FIG. 5B, in accordance with example embodiments.

FIG. 5D shows a photograph of the system 514 of FIG. 5B, in accordance with example embodiments.

Figure 6A:
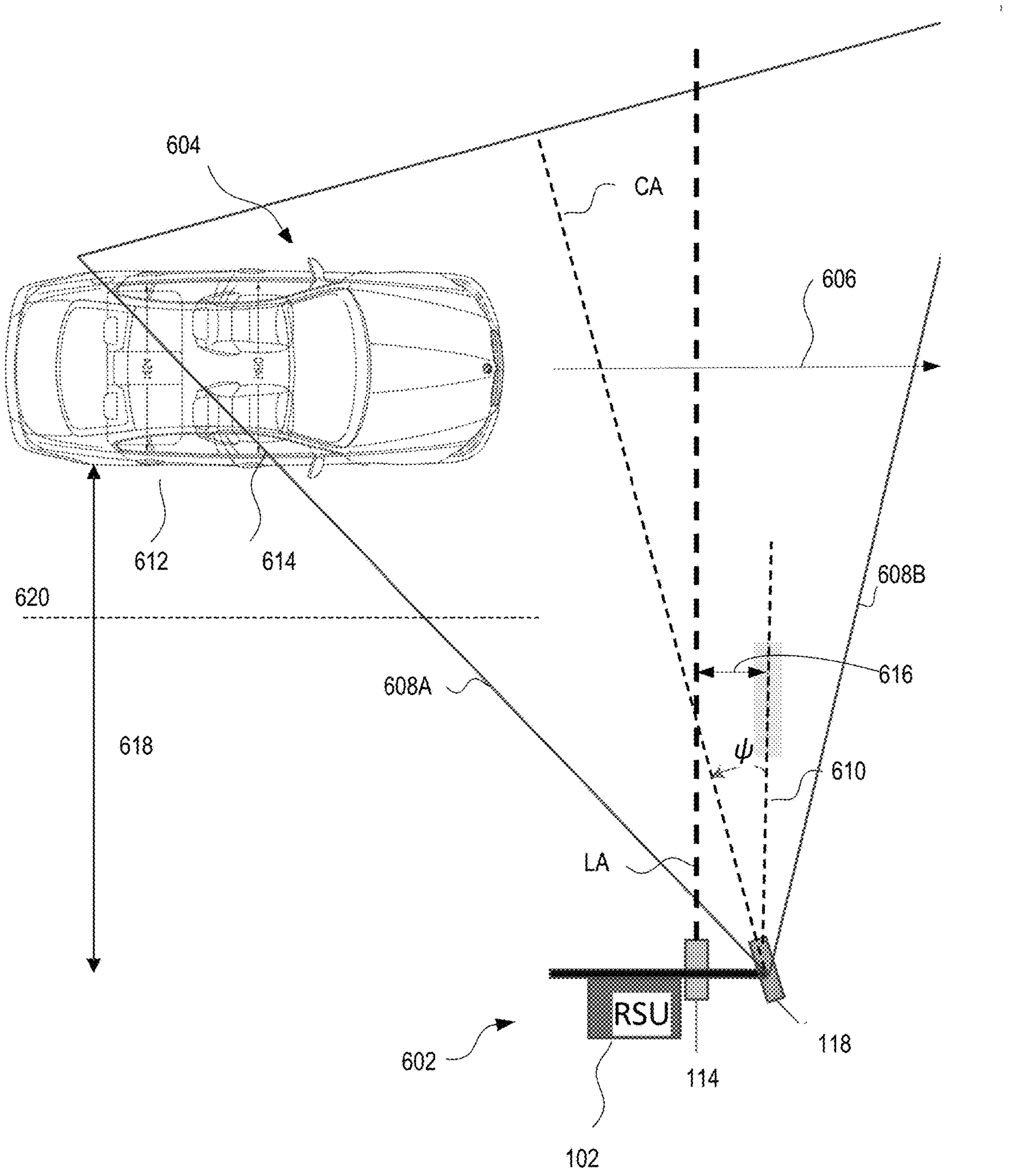
FIG. 6A is a top view of an example system for vehicle occupancy detection with a vehicle in a first position, in accordance with example embodiments.

FIG. 6A is a top view of an example system 602 for vehicle occupancy detection, in accordance with example embodiments.

Vehicle 604 is shown travelling in an expected direction of vehicle travel 606 (hereinafter referred to as direction 606), upstream of the vehicle detector(s) 114 and the imaging device(s) 118 in this example embodiment. Direction 606 is shown as being parallel to the lane marker 620, in accordance with a typical vehicle direction travelling along a lane.

Imaging device(s) 118 is shown having a horizontal field of view (e.g., defined by edges 608A and 608B), and is pointed in a direction CA defined by a yaw angle (ψ) of 15 degrees from an axis 610 perpendicular to lane marker 620. The yaw angle may be configured depending on the expected speed of the vehicle travelling along the road. For example, the yaw angle may be decreased where traffic is expected to be slower, ensuring consistency between installations which have high traffic and low traffic. In example embodiments, the yaw angle of the imaging device(s) 118 is fixed, and the patterns during which the light emitter (not shown in FIG. 6A) and imaging device(s) 118 emit light, and capture light, respectively, is varied. The field of view of imaging device(s) 118 may depend on the installation environment or intended use, and in example embodiments, the field of view is 30 degrees. The yaw angle may increase the accuracy of the vehicle detection system by forcing images to contain certain perspectives, which, when multiple consecutive images are captured of vehicle 604 traveling at different speeds are captured at said perspectives, contributes to all front and rear occupants of the vehicle 604 being visible in the captured images.

In some embodiments, the processor can compute the yaw angle. In some embodiments, there are multiple images from the vehicle so that occupants are seen from different perspectives as the vehicle travels horizontally across the field of view, which can be reflected in extracted data from the images. A camera may have a large horizontal field of view and the system may be able to achieve a good amount of change of perspective by taking multiple successive images as the vehicle is traveling from one end of the horizontal field of view to the other, even with a zero yaw angle. However, having a large of a field of view may not always possible or favorable for some other reasons. Using a nonzero yaw angle may accentuate the change of perspective within a limited horizontal motion of the vehicle in the field of view. Accordingly, the system computes data corresponding to change of perspective, and, in some embodiments uses the yaw angle" as an example metric.

The vehicle detector(s) 114 is pointed in the direction of axis LA, which is perpendicular to direction 606. The vehicle detector(s) 114 may, similar to imaging device(s) 118, be positioned with a yaw angle towards incoming traffic. Various positions of the vehicle detector(s) 114, relative to imaging device(s) 118 are contemplated. The vehicle detector(s) 114 may be relatively close to the imaging device 114, or in example embodiments, the vehicle detector(s) 114 may be much further upstream of the imaging device(s) 118 to account for the expected speed of the incoming traffic. In some embodiments, the vehicle detector(s) 114 are not upstream relative to the traffic, and are in other locations.

Both the imaging device(s) 118 and the vehicle detector(s) 114 are located a distance 618 from an expected position of the vehicle. The distance 618 may be determined based on the geometry of the lane which is being observed. For example, lanes vary in width, the location of the system 602 may be located further than the road in certain installations, and so forth. In example embodiments, the distance is determined by: $L=\rho \cos \alpha$, where L is the distance 618 in a direction defined by axis 610, where p and a are shown in FIG. 6D. In example embodiments, the distance 618 is 5 meters. In example embodiments, the distance from the imaging device(s) 118 to the expected position of region of interest 614 (e.g., the distance from the imaging device(s) 118 to the middle of the lane) may be different from the distance from the vehicle detector(s) 114 to the expected position of region of interest 614 (e.g., the distance from the vehicle detector(s) 114 to the middle of the lane).

Once the desired distance 618 is determined, the system 602 may be fixed with this distance (e.g., secured to a concrete pad). Similarly, the distance 616, in direction 606, between the imaging device(s) 118 and the vehicle detector (s) 114 may be fixed after installation. In example embodiments, the distance 616 is 30 centimeters.

In FIG. 6A, the region of interest 614 is shown in part in the field of view of imaging device(s) 118, and the region of interest 612 is not. Imaging device(s) 118 does not capture an image of vehicle 604 in FIG. 6A as the vehicle 604 has not been detected by the vehicle detector(s) 114.

Figure 6B:
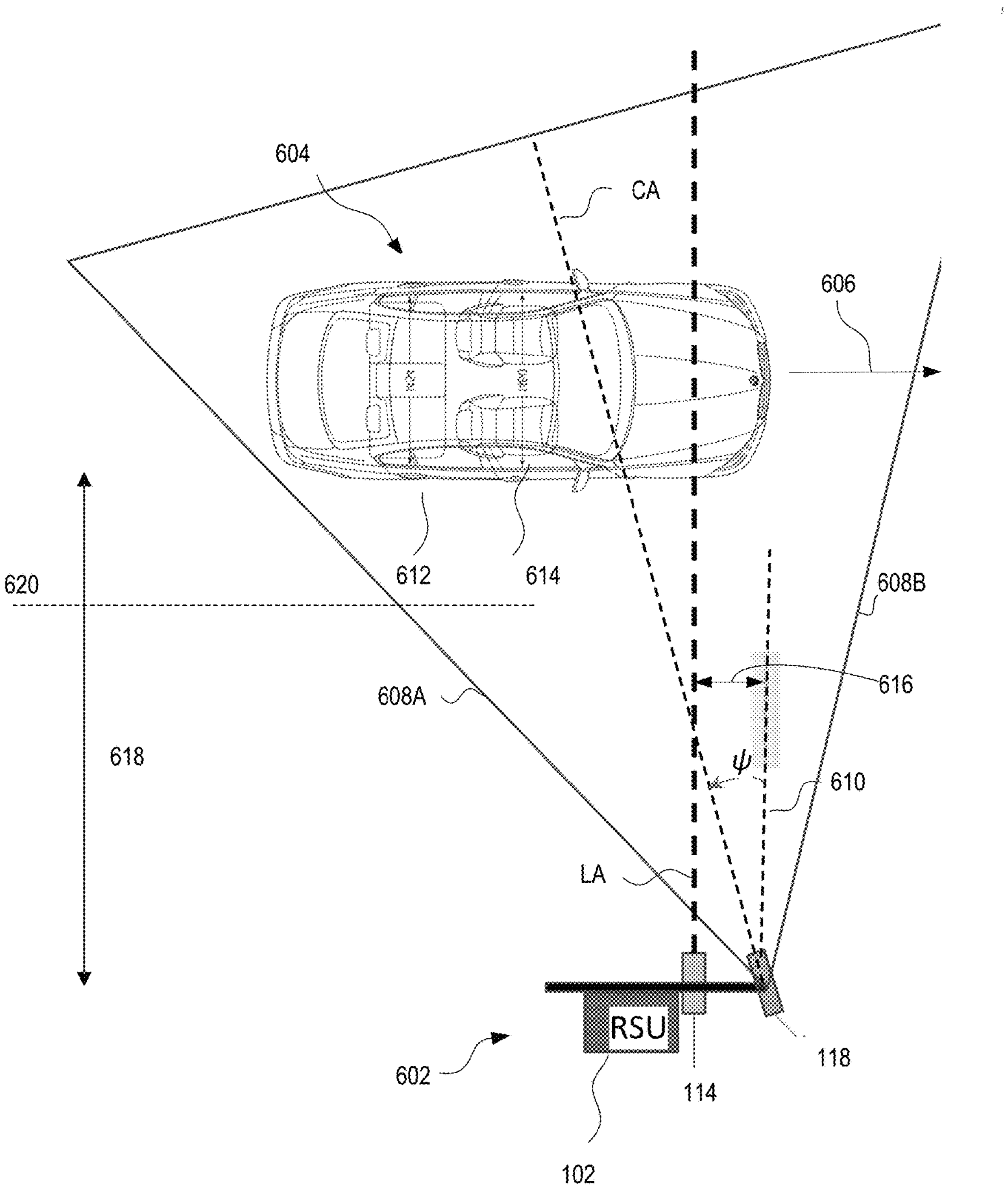
FIG. 6B is a top view of an example system for vehicle occupancy detection with a vehicle in a second position, in accordance with example embodiments

In FIG. 6B, vehicle 604 has advanced in the direction 606 and the region of interest 614 is shown directly in the line of sight of imaging device axis CA. When the vehicle 604 is detected, the imaging device(s) 118 can be activated or controlled (via hardware or software) to take one or multiple images of the vehicle 604 in this instance.

Figure 6C:
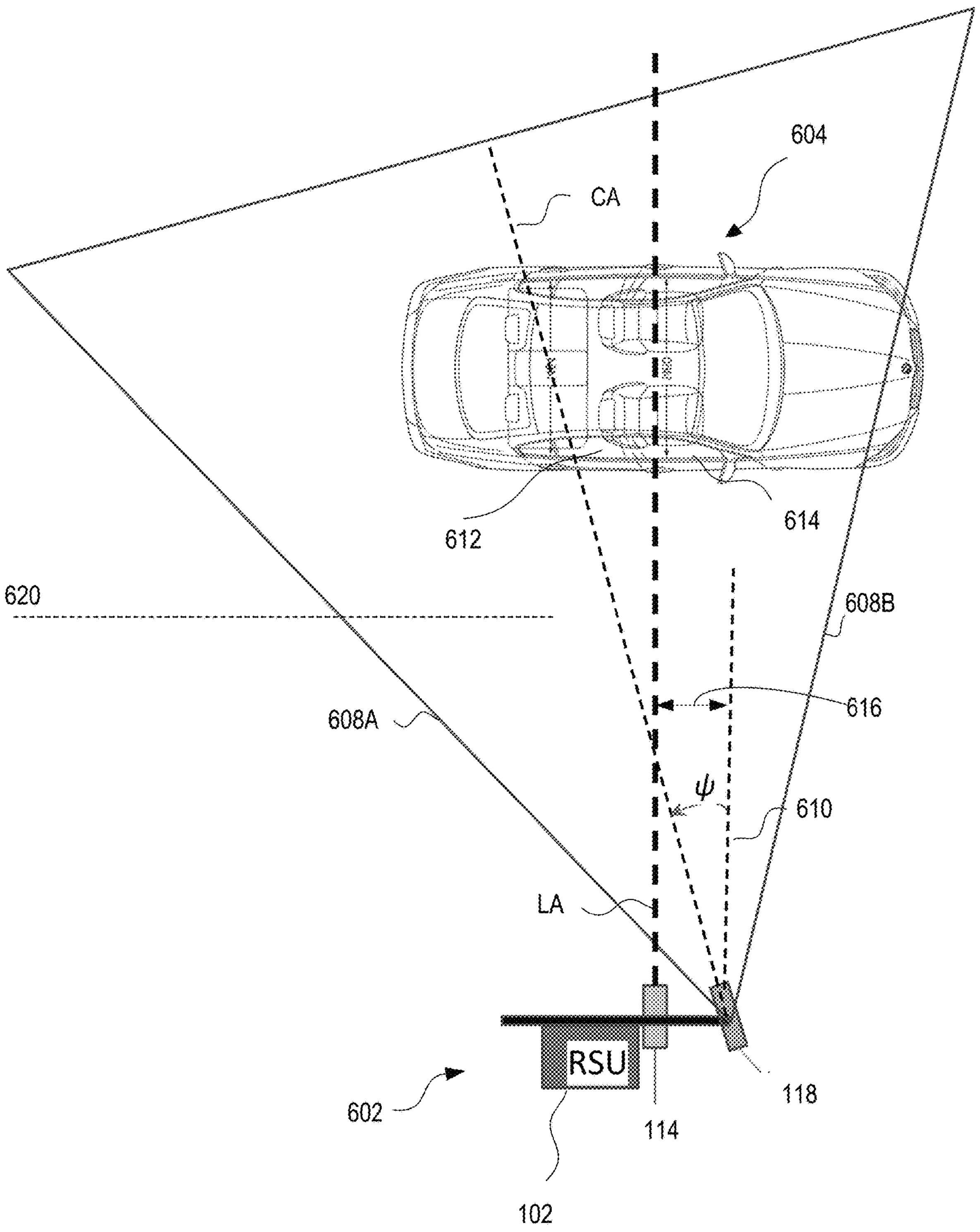
FIG. 6C is a top view of an example system for vehicle occupancy detection with a vehicle in a third position, in accordance with example embodiments
Figure 6D:
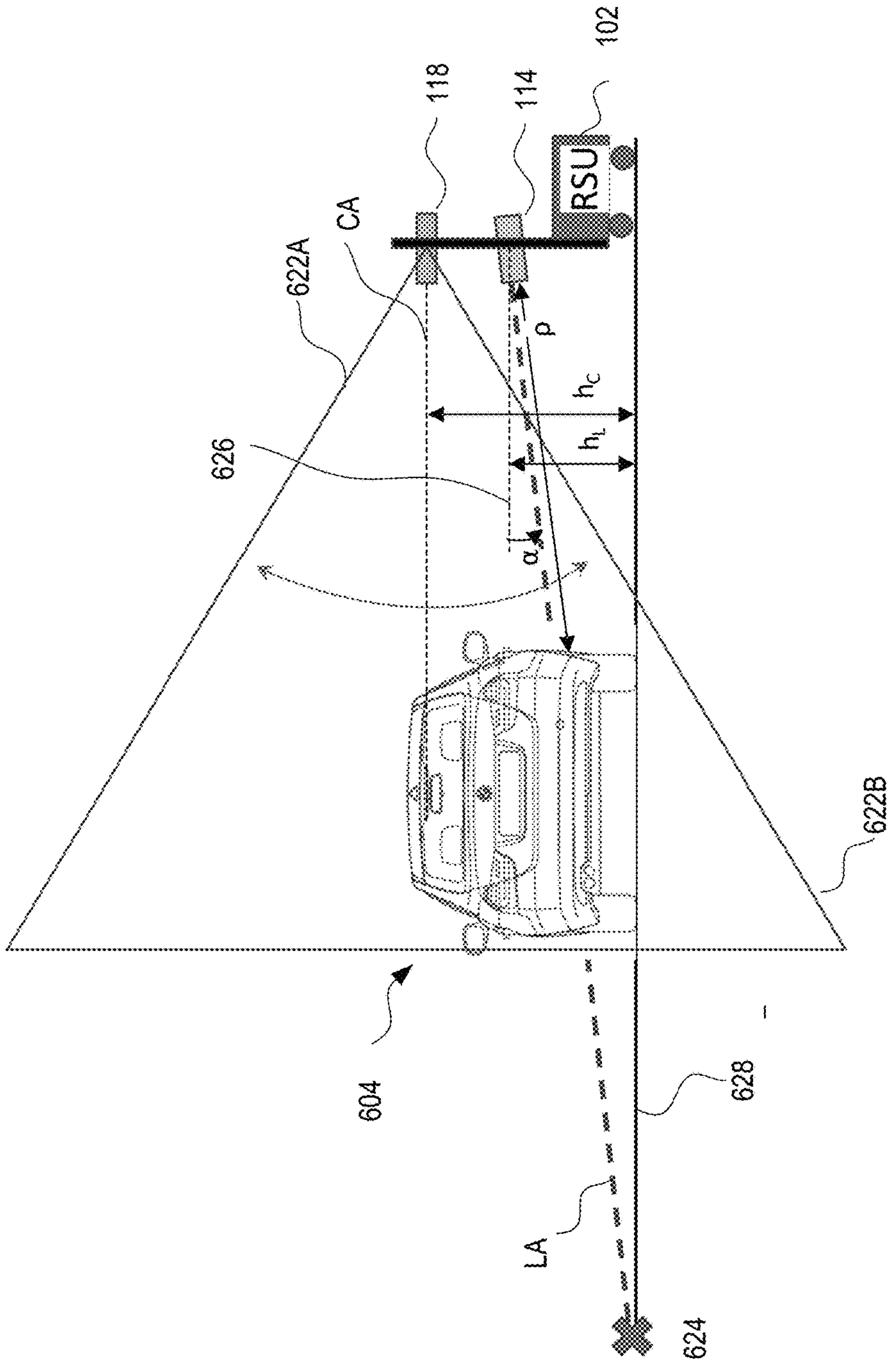
FIG. 6D is a rear view of the example system for vehicle occupancy detection of FIG. 6A, in accordance with example embodiments.

In FIG. 6C, the region of interest 612 is prominently in the line of sight of imaging device axis CA. Imaging device(s) 118 may be configured to capture an image at this relevant distance instance. A region of interest is in a field of view when the feature reflects light towards imaging device(s) 118 in a direction such that it is captured by the particular configuration of imaging device(s) 118. For example, there may be a region of interest that is not in the field of view of imaging device(s) 118 as light reflected from said feature cannot travel through vehicle 604 and be captured by imaging device(s) 118.

FIG. 6D is a rear view of the example system 602 for vehicle occupancy detection of FIG. 6A. In contrast to imaging device(s) 118, the vehicle detector(s) 114 is shown as having a pitch angle $\alpha$ relative to axis 626 a distance $h_L$ to the ground 628. Vehicle detector(s) 114 is aimed in direction LA towards a point 624 horizontally further from the vehicle detector(s) 114 relative to an expected position of vehicle 604. In example embodiments, where ground 628 is flat, the pitch angle $\alpha$ is 5.25 degrees and the point 624 may be approximately 10 meters away from vehicle detector(s) 114. In this way, vehicles travelling closer to the vehicle detector(s) 114, for example at a distance p along axis LA, will interfere with light travelling along axis LA and reflect light to vehicle detector(s) 114. In example embodiments, the vehicle detector(s) 114 is positioned such that distance $h_L$ is larger than some vehicles' wheel wells, providing a more accurate reading of whether a vehicle is passing by. The distance $h_L$ is approximately 90 centimetres according to some embodiments.

Imaging device(s) 118 is positioned a distance $h_C$ above the ground 628. In example embodiments, the distance $h_C$ is 145 centimeters, which may be a distance of an expected height of an average car to the ground 628. Imaging device(s) 118 has a line of sight CA which is parallel to the ground 628 in this example embodiment, however imaging device(s) 118 may have various pitch positions.

Referring again to step 408 in FIG. 4, the preferred mounting geometry may be determined in reference to the base geometry 500. For example, the preferred mounting geometry may include maximal variation for each of the constituent elements of a base geometry. Continuing the example, the preferred mounting geometry may be constrained to have constituent elements placed within 20 cm of the configuration 500, and have orientations (e.g., pitch, yaw, and roll) within 10° of the configuration 500. Advantageously, determining a preferred mounting geometry based on a base mounting geometry may allow for a larger variation of configurations which provide accurate results, reducing the need for meticulous calibration of the constituent elements of system 100.

At step 410, the preferred geometry is output. The output preferred geometry may be displayed on a display, allowing for a visual reference for a technician to mount the vehicle occupancy detection system. The output preferred geometry may be a geometry which enables the imaging device(s) 118 to capture more than one image of the detected vehicle. The system can store the output preferred geometry in memory, or transmit the output preferred geometry to another system or component.

At step 412, the zoom of the imaging device(s) 118 may be adjusted in accordance with the output preferred geometry. For example, the computing device 102 may be engaged to monitor whether the installation satisfies the output preferred geometry. Continuing the example, where the computing device 102 determines that an imaging device(s) 118's zoom is not satisfactory, the display may display a notification including instructions required to adjust the imaging device(s) 118's zoom.

According to some example embodiments, step 412 includes the system 100 operating in a diagnostic mode for a period of time until the system determines that the installation satisfies the output preferred geometry. For example, the output preferred geometry may be provided to the occupant detector 110, which determines whether the preferred geometry has been complied with after installation. In example embodiments, the output preferred geometry includes an indicator of the imaging device(s) 118's zoom, which may be continually monitored.

The system 100 may be modular, and the constituent elements may be attached to a mounting device (e.g., mounting device 506) separately, allowing for rapid deployment and set up.

The system 100, once mounted, may not require further training of the occupant detector 110 in order to detect occupants. Alternatively stated, the occupant detector 110 may be pre-trained to work with the preferred mounting geometry without additional training or adjustments to the machine learning model stored thereon.

Figure 7:
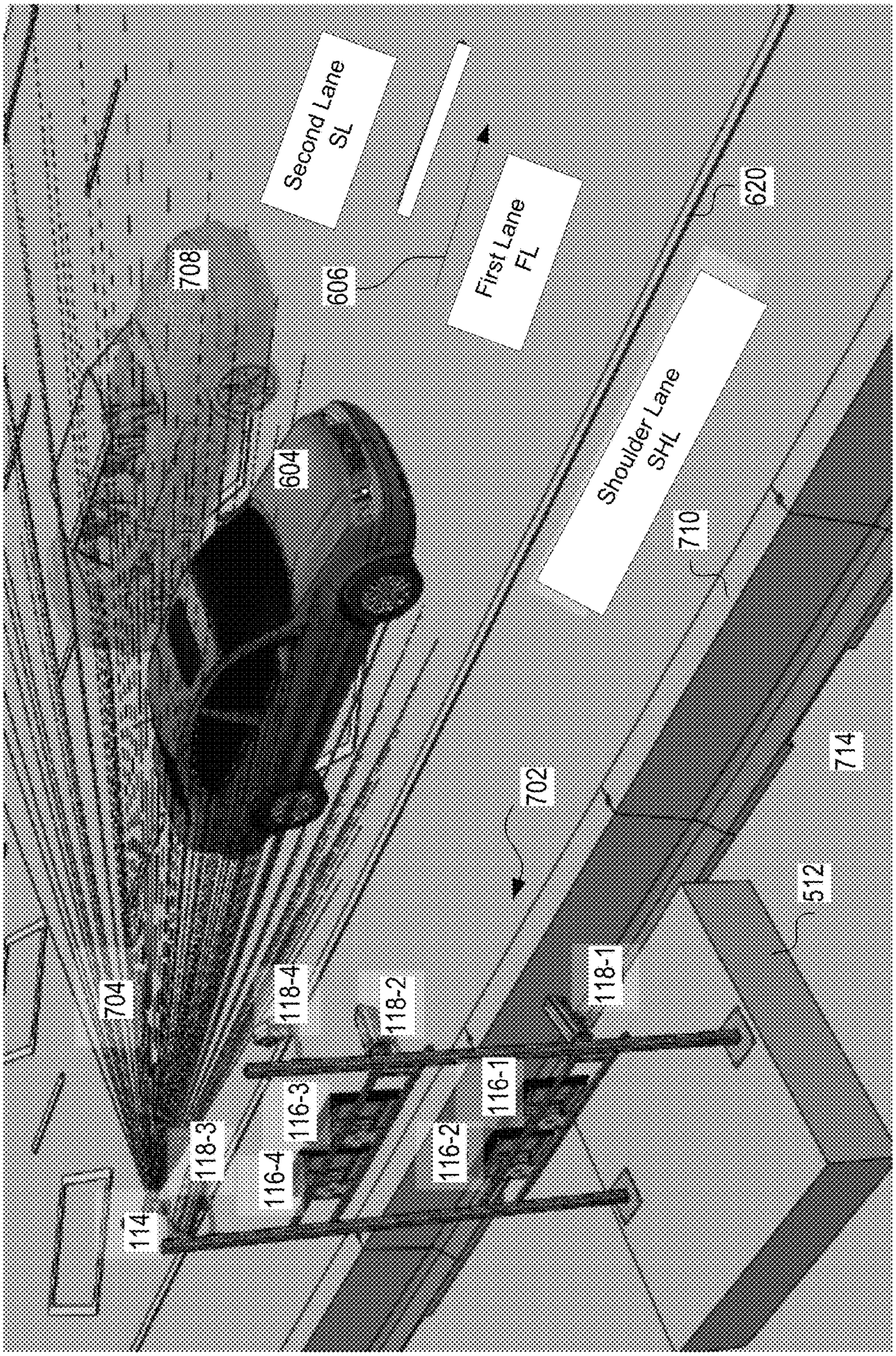
FIG. 7 is a perspective view of a further example system for vehicle occupancy detection, in accordance with example embodiments.

FIG. 7 is a perspective view of a further example system 702 for vehicle occupancy detection, in accordance with example embodiments. System 702, similar to system 514, includes light emitter(s) 116-1, and imaging device(s) 118-1 mounted on top of a gantry connected to a concrete pad 512. The light emitter(s) 116-1, and imaging device(s) 118-1 are positioned approximately 1.5 meters above ground to see overtop of the concrete barrier 710. In example embodiments, the system 702 is preferably positioned between approximately 4 to 8 meters from lane 620 measured perpendicular relative to the direction of travel, on a road portion adjacent to the nearest lane 620 and alternatively referred to as a roadside.

System 702 further includes light emitter(s) 116-3 and 116-4, and imaging device(s) 118-2 for vehicle occupancy detection positioned a further distance above the ground 714, relative to light emitter(s) 116-1, and imaging device(s) 118-1. Whereas light emitter(s) 116-1, and imaging device(s) 118-1 are positioned to capture images of vehicles travelling in the first lane FL of traffic (e.g., based on their height above the ground and their pitch), the light emitter(s) 116-3 and 116-4, and imaging device(s) 118-2 are positioned (e.g., based on their height above the ground 714, and their pitch) to capture images of vehicles travelling in the second lane SL of traffic. For example, in the shown embodiment, the light emitter(s) 116-3 and 116-4, and imaging device(s) 118-2 are positioned approximately 2 meters above the ground 714, and imaging device(s) 118-2 is pitched downward approximately 10 degrees, with a yaw angle of 15 degrees.

Vehicle detector(s) 114 is positioned above both light emitter(s) 116-1, and imaging device(s) 118-1 and light emitter(s) 116-3 and 116-4, and imaging device(s) 118-2. In example embodiments, a plurality of vehicle detectors 114 are used to determine, respectively, whether a vehicle is passing in each respective lane. In example embodiments, plurality of vehicle detectors 114 are used to detect passing vehicles in either lane. In example embodiments, the vehicle detectors 114 are capable of scanning a wide horizontal field of view (e.g., at least 120 degrees) and a reasonable vertical field of view (e.g., at least 30 degrees).

In the shown embodiment, the vehicle detector(s) 114 is positioned with a yaw angle such that it is able to detect vehicles relative to the system 702 (e.g., vehicles 604 and 708). For example, the vehicle detector(s) 114 may detect vehicles approximately 15 to 20 meters before they are in the field of view of the respective imaging devices. In example embodiments including a plurality of vehicle detectors 114, each vehicle detector may be respectively positioned to detect vehicles at different distances.

The vehicle detectors may be 2D or 3D LIDAR units capable of capturing multiple readings of distances in multiple directions. For example, vehicle detector(s) 114 in the shown embodiment emits a plurality of light 704 (e.g., infrared light) towards both the first lane FL and the second lane SL. A potential advantage of using a 2D or 3D LIDAR vehicle detector(s) 114 that is capable of capturing a point cloud from moving vehicles compared to the single laser beam range measurement is increased robustness to dust particles and precipitation. While measurements from a single laser beam can easily get contaminated by noise, an entire point cloud of measurements from a vehicle is statistically more robust to noise. Also, since the vehicles (e.g., vehicles 604 and 708) can be detected before they are within the field of view of an imaging device, the more robust detection of passing vehicles may provide for more precise adjustments of the pattern between the light emission, image capture and vehicle detection. In example embodiments, the more precise estimation allows for detecting the vehicles a greater distance from the system 702, and allows greater filtering windows (i.e., the use of larger windows of time between detection of the vehicle and capturing an image of the vehicle) without risking detecting the car too late.

Imaging devices 118-3 and 118-4 may be used to capture images of the front and rear license plates. For example, in the shown embodiment, imaging device(s) 118-3 is at a yaw angle which points in the direction 606 to capture rear license plates.

Figure 8:
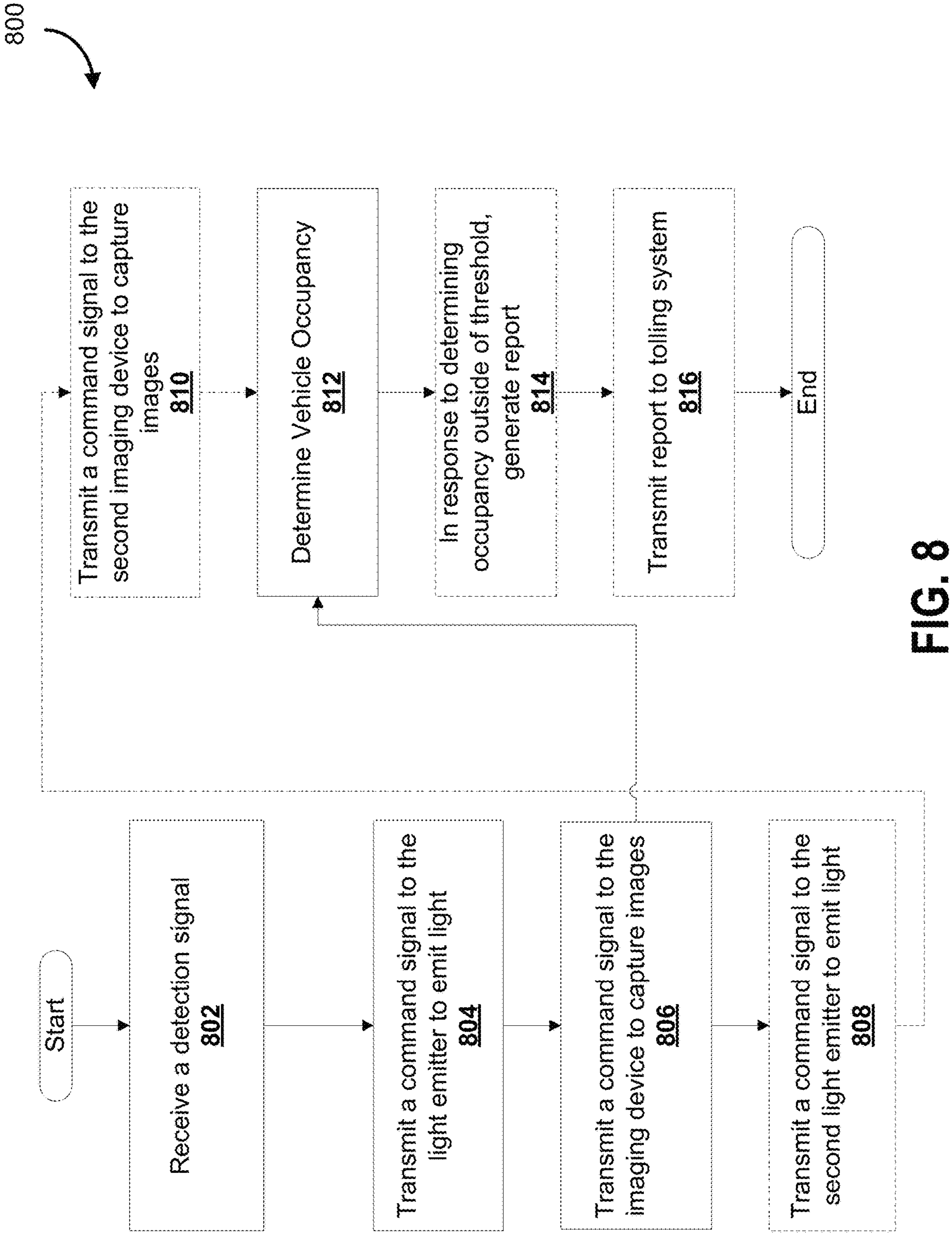
FIG. 8 is a flowchart of an example method for vehicle occupancy detection, in accordance with example embodiments.

FIG. 8 is a flowchart of an example of method 800 for vehicle occupancy detection, in accordance with example embodiments.

Method 800 may be implemented by the occupant detector 110, for example, or by a remote computing device.

At step 802, a detection signal is received from the vehicle detector(s) 114. In example embodiments, the detection signal includes a detected speed of the detected vehicle.

In example embodiments, as a result of the geometry of the installation of system 514 (e.g., the yaw angle ¿ of imaging device(s) 118, the horizontal field of view of the camera (e.g., defined by the edges 608A and 608B), distance between the imaging device(s) 118 and the vehicle detector(s) 114, etc. shown in FIG. 6A), the system ensures that when the vehicle 604 is detected, the imaging device(s) 118 is triggered instantly, and the entire vehicle 604 is within the camera's horizontal field of view (e.g., FIG. 6B).

At step 804, a command signal is transmitted to the light emitter(s) 116 to emit light according to a first pattern for a first time window. In example embodiments, the first pattern is determined by the speed of the vehicle as detected by the vehicle detector 114. According to some embodiments, for example, the first pattern is a preconfigured frequency based on the configuration of the system 100. Continuing the example, the preconfigured frequency may be based on the detection distance, the latency associated with vehicle detection, and the operating frequency of the imaging device(s) 118.

In an illustrative embodiment, for traffic where vehicles are expected to be travelling with speeds around 80-140 km/h, the frequency can be 90 pulses per second. This frequency can provide for 5 sufficient quality images of passing vehicles.

In example embodiments, once the vehicle 604 is detected, the vehicle position, direction of travel and speed is tracked using a tracking approach, such as a Kalman filter. The estimation of position and speed of the vehicle 604 can then be used to trigger, for example, the license imaging device(s) 118-3 of FIG. 7 (e.g., when the vehicle 604 is about 10-14 meters upstream of system 702), and then trigger the imaging devices 118-1 and 118-2 multiple times at optimal places to take multiple shots for occupancy counting. The tracking approach keeps tracking the vehicle until it passes the system, and when it is 10-14 meters away it triggers the imaging device(s) 118-4 to capture images of the rear license plate if necessary. The detection and tracking of cars in multiple lanes (at least lane 1 and 2, and possibly the shoulder lane or lane 3) can happen simultaneously in a perception software system which can be implemented by computer 102.

In example embodiments, the occupant detector 110 may receive ambient condition information from the ambient condition sensor 130, and determine an optimal configuration for the light emitter(s) 116 based on the received ambient condition. The optimal configuration is then transmitted along with the control signals. For example, based on received ambient conditions, the occupant detector 110 may determine that the light emitter(s) 116 intensity should be increased, and transmit control signals reflecting same.

The first time window may be, similar to the first pattern, dynamic or preconfigured.

At step 806, the command signal is transmitted to the imaging device(s) 118 to capture images according to a second pattern associated with the first pattern, for a second time window associated with the first time window. The second pattern is associated with the first pattern of the light emitter(s) 116 so that the imaging device(s) 118 captures the light emitted by the light emitter(s) 116 (e.g., the imaging device(s) 118 captures images after light has been emitted). In example embodiments, the second pattern may be based on the latency associated with the light emitter(s) 116 emitting light, and the latency associated with the command signal reaching the imaging device(s) 118. In a non-limiting example embodiment, the imaging device(s) 118 may be configured to capture successive high-speed snapshots (e.g., 5 images) of the detected vehicle as it passes the system 100.

In example embodiments, the transmitted command signal includes configuration signals for adjusting the imaging device(s) 118's acquisition parameters (e.g., the number of pictures taken for each vehicle, imaging device exposure time, imaging device frame rate, gain settings, focal length, etc.) based on the ambient conditions in order to maximize the quality of the image acquisition, which may in turn lead to higher overall accuracy. The ambient conditions may be received by the computing device 102 from the ambient condition sensor 130, from an external ambient condition data service provider, or otherwise. For example, at higher detected vehicle speeds, the imaging device(s) 118 may capture images at a greater frequency (i.e., a higher FPS) or imaging device(s) 118 may begin capturing images more rapidly in response to a vehicle being detected (e.g., using a shorter filtering algorithm window). Conversely, at lower detected vehicle speeds, imaging device(s) 118 may reduce the frequency of image capture (i.e., the FPS) or increase the algorithm window size.

In example embodiments, the command signal transmitted to the imaging device(s) 118 is configured to avoid lens distortion effects associated with the vehicle 604 being too close to the margins of the captured images (e.g., too close to edges 608A and 608B). The system 100 may compute a speed of travel, and align the command signal to capture images of the vehicle without the region of interest being within a threshold of the edges 608A and 608B. For example, based on an average vehicle length of 4.5 to 5 meters, the system 100 can estimate the speed of traffic as multiple cars pass by the vehicle detector(s) 114 (e.g., each car passage will register similar to an inverted square pulse, and the time-length of the pulse assuming a nominal length of vehicles, can be used to estimate speed of traffic). Alternatively, the system 100 can be integrated with other systems such as toll bridges that monitor traffic and estimate vehicle speeds, and system 100 may estimate a likely position of the vehicle based on said data to adjust the duration and frequency of operation of the imaging device(s) 118 (e.g., the filtering window length and image acquisition speed (FPS)).

The second time window may be, similar to the first time window, dynamic or preconfigured.

Optionally, at steps 808 and step 810, the second light emitter 124 and the second imaging device 126 may be configured to, respectively, emit light and capture images associated with the rear of the detected vehicle. The images associated with the rear of the detected vehicle may be analyzed to determine a license plate number of the detected vehicle.

At step 812, the occupant detector 110 receives the captured images from the imaging devices, and determines a vehicle occupancy.

In some embodiments, the occupant detector 110 determines a first region of interest of the vehicle in each of the plurality of captured images, a second region of interest of the vehicle, and determines the number of visible occupants in each region of interest image as the vehicle occupancy. For example, the occupant detector 110 may be trained to detect occupants based on expected positions within the detected vehicle (e.g., it is more interested in the location of a vehicle above or near to a seat, as opposed to spaces between seats). Continuing the example, the occupant detector 110 may then use as a vehicle occupancy the maximum number of determined occupants for each window (e.g., whether 1, 2 or 3 occupants are visible in the window), combining the results from multiple images into a single result (e.g., a simple max_per_window_acrossallimages approach).

The occupant detector 110 may determine the vehicle occupancy in part based on determining a rear and a front occupancy. For example, the occupant detector 110 may separately determine the amount of occupants visible in each seating row of a detected vehicle. This approach may have the advantage of simplifying the system 100, introducing redundancy, and in turn improving accuracy and reducing overall cost of the system.

According to example embodiments, the vehicle occupancy may be determined as the most likely number of occupants based on each of the respective number of visible occupants in each image processed. For example, where the occupant detector 110 determines differing amounts of occupants in each of the images of the detected vehicle, it may be configured to determine the vehicle occupancy as the most commonly occurring number of occupants across images, or the number of occupants detected by the images which are side views of the vehicles, and so forth.

In further example embodiments, the occupant detector 110 uses an occupant model to determine the number of vehicle occupants. For example, the occupant detector 110 may be trained to fit an occupant model to determine a most likely model which first all images associated with the detected vehicle.

The occupant detector 110 may normalize the images prior to processing same. For example, the occupant detector 110 may normalize the images so that the vehicle is the same size in each image, or normalize the images so that the effect of ambient conditions is consistent across images (e.g., images with strong glare may be filtered to reduce glare). The images which have normalized vehicles may be normalized based on occupant detector 110 determining respective normalization parameters based on the vehicle speed and the first pattern and the first time window.

In some embodiments, for example, the occupant detector 110 may generate and use a normalized vehicle model populated with each of the plurality of images processed with the respective normalization parameters to normalize the vehicle across the captured plurality to images.

The occupant detector 110 may be configured to discard images which do not include the detected vehicle (e.g., false positive triggers). For example, where the vehicle detector(s) 114 detects a vehicle, a separate vehicle detector (not shown), such as a machine learning model configured to detect vehicles in images, as opposed to using LiDAR, may determine whether the captured images include a car (as opposed to an animal, etc.).

The occupant detector 110 may detect a vehicle occupancy of a detected vehicle by normalizing detected two or more vehicles in the plurality of images relative to one another. For example, where there are five successive images include multiple detected vehicles, the occupant detector 110 may be configured to enlarge the portions of the images with the respective detected vehicles so that they are the same size.

According to some embodiments, for example, the occupant detector 110 may further normalize images with respect to the ambient conditions. For example, where the direction of the sun is detected (e.g., via the direction of sunlight intensity), the images wherein the vehicle is incident with more powerful sunlight may be filtered to mimic conditions in other images where the sunlight is weaker.

Optionally, at steps 814 and 816, the occupant detector 110 may be configured to respectively generate and transmit a report. In example embodiments, the report is generated and transmitted in response to determining a vehicle occupancy outside of a threshold. The report may for example be generated for and transmitted to a tolling agency (not shown), which tolls vehicles in response to the occupancy detection outside of the threshold.

In example embodiments, the threshold is based on a determination of whether a vehicle is in violation of existing vehicle occupation law over a confidence interval. For example, where the detected vehicle is in a high occupancy vehicle (HOV) lane which requires more than 3 occupants, the threshold may be whether the system 100 is more than 90% confident that there are more than three occupants. Further discussion of the confidence interval is discussed below.

The report may include a date, time of day, estimated speed, vehicle type, lateral position of vehicle in lane, front occupancy, rear occupancy, overall occupancy, front occupancy confidence, rear occupancy confidence, overall occupancy confidence, and a license plate of the vehicle (detected from the images captured by the second imaging device 126), all of which may be extracted from the images received by the occupant detector 110. The report may include health monitoring information on all of the sensors and hardware components of system 100.

The report may be stored in a standard SQL database allowing for interfacing with well-known application program interfaces (APIs) to query the data and generate any desired report via SQL queries.

The report may include the one or more captured images and metadata associated with the one or more captured images of the detected vehicle, and bounding boxes representing the detected occupants.

In example embodiments, the report is a report which describes, for example, detected vehicles weaving between lanes (e.g., where a calculated speed and position of the vehicle is outside of the expected lane markers) and/or stunt driving (e.g., erratic behaviour of the region of interest—such as high speeds, dangerous proximity to other vehicles, etc.) and documenting such unlawful driving behavior for purpose of law enforcement.

According to some embodiments, the report may include information gleaned from monitoring traffic over multiple lanes over different hours of the day, different days of the week and different seasons, and extracting useful information and statistics about road usage. For example, the report may provide comprehensive statistics about which lanes are most dangerous, which lanes appear to have potholes (e.g., consistent weaving of lanes in a particular location), driving characteristics and how they change in response to the environment (e.g., tracking the performance of a snow removal contractor over time) and so forth.

Figure 15A:
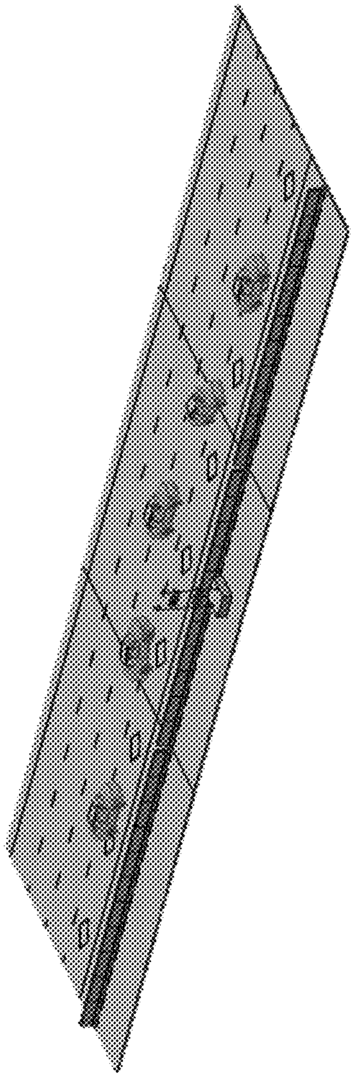
FIG. 15A is an example diagram of vehicle weaving.
Figure 15B:
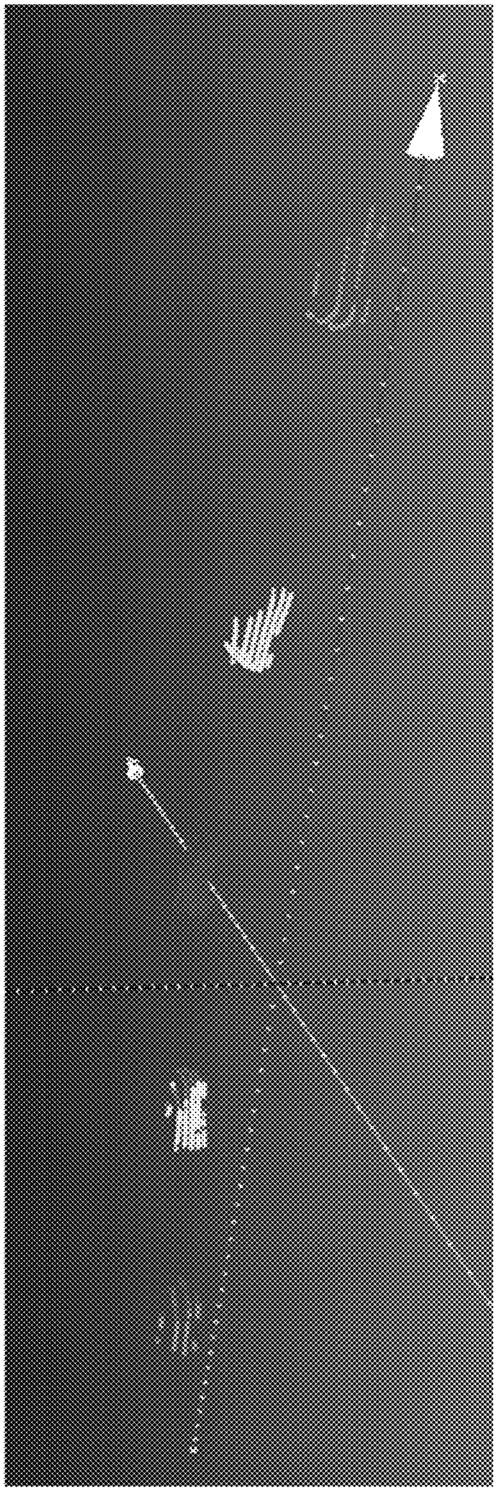
FIG. 15B is an example schematic diagram of vehicle detector sensor for detecting vehicle weaving in accordance with an embodiment.

FIGS. 15A and 15B show an example of vehicle weaving and an anti-weaving feature of the system 100.

As shown in FIG. 15A, the system 100 can be made to detect if a vehicle passing in front of it is trying to weave away into farther lanes in an attempt to avoid having its occupancy counted. The anti-weaving feature of the system 100 is useful to ensure usage of the entire system for HOV (high occupancy vehicle) lane and HOT (high occupancy toll) lane use cases.

As shown in FIG. 15B, an example implementation can use the same vehicle detector sensor of the system 100, such as for example a sensor that is 3D LiDAR. The example in FIG. 15B shows 3D visualizations observed by the vehicle detector sensor that can be utilized to observe the trajectory of the vehicle motion on the road and detect if a lane change is occurring in the lateral direction before and after the station longitudinally. As an alternative to 3D LiDAR in the event a station is equipped with only a 1D laser range finder or any other vehicle detector with limited capabilities, for example, the system 100 can have an additional camera installed higher up and a large field of view to observe this vehicle motion.

The system can compute a trajectory of the vehicle motion on the road and detect if a lane change is occurring in the lateral direction before and after the station longitudinally. The system can use 3D LiDAR or add an additional camera installed higher up and a large field of view to observe this vehicle motion.

In some embodiments, there is provided a system for detecting occupancy of a vehicle travelling in an expected direction of travel along a road. The system has a first roadside imaging device positioned on a roadside, having a first field of view of the road, the first field of view incident on a side of the vehicle when the vehicle is on the road within the first field of view. The system has a first roadside light emitter emitting light towards vehicles in the first field of view. The system has a roadside vehicle detector. The system has a processor, in communication with a memory, configured to: receive a signal from the roadside vehicle detector indicating that the vehicle is within or proximate, relative to the expected direction of vehicle travel, to the first field of view; command the first roadside light emitter to emit light according to a first pattern for a first duration; command the first roadside imaging device to capture images of the side of the vehicle according to a second pattern associated with the first pattern, during a second duration associated with the first duration; receive the captured images of the side of the vehicle from the first roadside imaging device; compute a vehicle occupancy of the vehicle by, in each of the captured images: determining one or more regions of interest of the vehicle in each of the captured images; determining the vehicle occupancy as a number of visible occupants in the one or more regions of interest; and determining a most likely number of occupants based on each determined vehicle occupancy. The system can transmit the vehicle occupancy to a monitoring system.

Figure 9:
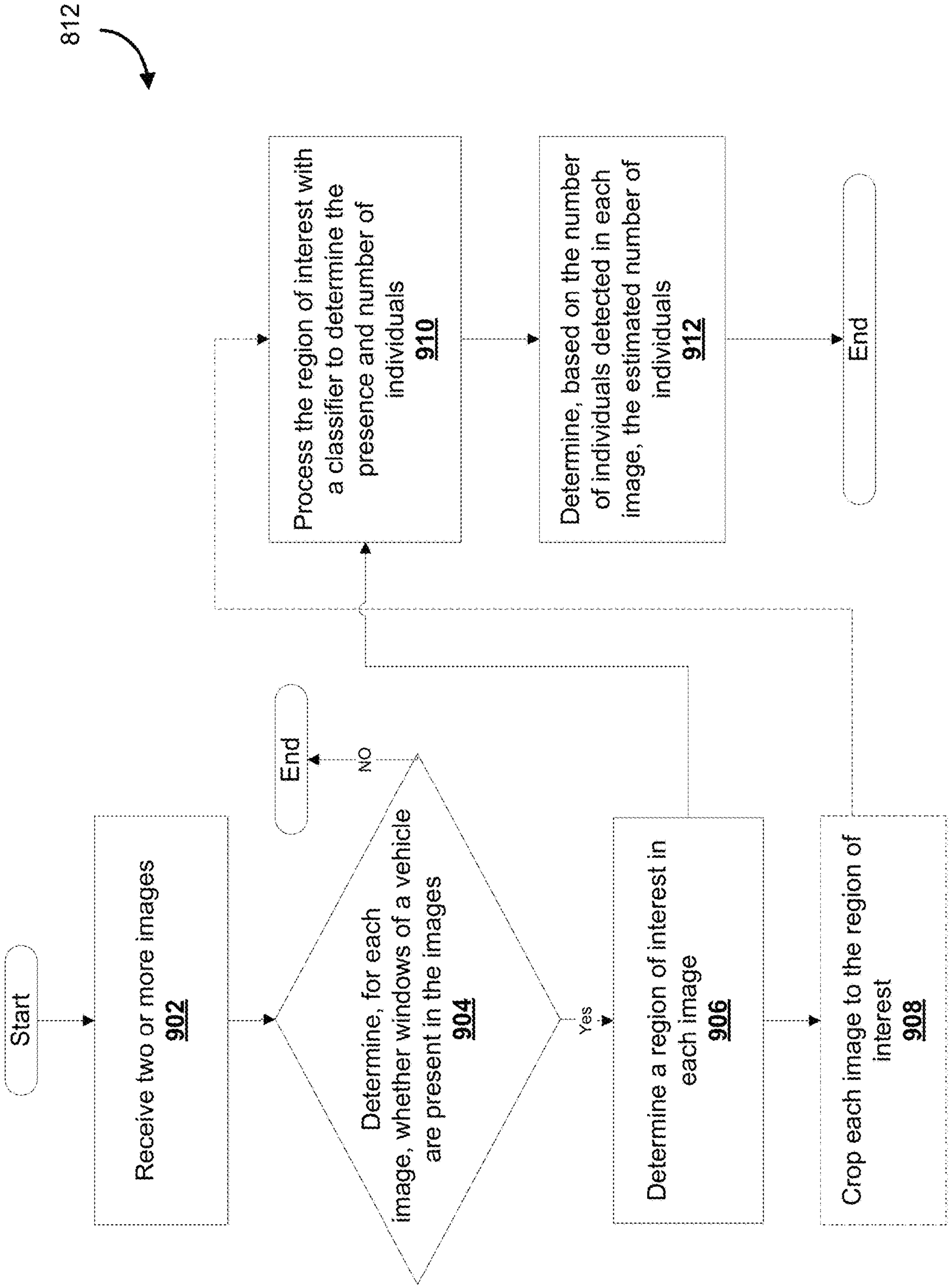
FIG. 9 is a flowchart of an example method to complete step 812 of FIG. 8 for detecting occupants in images, in accordance with example embodiments.

FIG. 9 is a flowchart of an example method to complete step 812 of FIG. 8 for detecting occupants in images, in accordance with example embodiments.

At block 902, images are received, for example by the occupant detector 110. In some embodiments, an image may be received, or in some embodiments two or more images may be received.

Capturing more than one image can enable the system to extract more information from multiple images and can help avoid obstruction of occupants by the vehicle window frames or obstruction of farther sitting occupants by closer sitting occupants. However, in some cases even one image can be sufficient. Multiple images may achieve higher performance and robustness, but capturing and processing an image may also provide sufficient data in some embodiments.

At block 904, each image is processed to determine the pixels associated with a window of a vehicle. For example, the occupant detector 110 may implement an SST detector, trained to identify a vehicle in an image. Where no vehicle is detected, the occupant detector 110 may record this as an instance of no occupants.

At block 906, a region of interest is determined for each image. In example embodiments, this block is performed simultaneously with block 904. In example embodiments, one or more regions of interest are identified, such as a front and rear side window (e.g., region of interests 612 and 614). Where a region of interest is not detected, the image is discarded, or the occupant detector 110 may record this as an instance of no occupants.

The license plate recognition can be done on the front side or the rear side, or both sides. Lighting conditions and country/province of operation (e.g., depending on requirement a front plate on vehicles) are factors to consider.

Optionally, at block 908, the images are cropped so that only pixels in the region of interest are referred to for occupant detection. In example embodiments, this may allow for a more efficient occupant detector capable of running on legacy systems with limited computing resources.

At block 910, the cropped image(s) are processed with the occupant detector 110 using a classifier to identify a number of occupants within the region of interest. For example, the classifier may be a single shot classifier SST trained to identify individuals in pixels.

At block 912, the vehicle occupancy is determined based on the classified number of individuals identified in block 910. For example, the occupant detector 110 may average the number of occupants identified.

In example embodiments, where the region of interest includes a front and a rear side window, the occupant detector 110 is configured to, (1) determine the amount of individuals present in the rear and front side windows, and (2) average, over the plurality of images, the number of detected occupants in each of the rear and the front side windows. Continuing the example, if there are five images, and the following number of occupants are detected in the rear side window in successive images: 2, 3, 2, 1, 2, the occupant detector 110 may determine that there are 2 occupants in the rear of the vehicle. A similar process may be carried out for the front side window. In example embodiments, where the region of interest includes a front and a rear side window, the occupant detector 110 is configured to count the number of occupants identified in each image for each of the front window and the rear side window, and determines the vehicle occupancy as the sum of (1) the maximum number of detected individuals in the front side window, and (2) maximum number of detected individuals in the rear side window.

Referring now to FIGS. 10A to 10G, which each show an image of a vehicle with various regions of interest shown, in accordance with example embodiments.

Figure 10A:
FIGS. 10A to 10G are each an image of a vehicle with various regions of interest shown, in accordance with example embodiments.
Figure 10B:
Figure 10C:
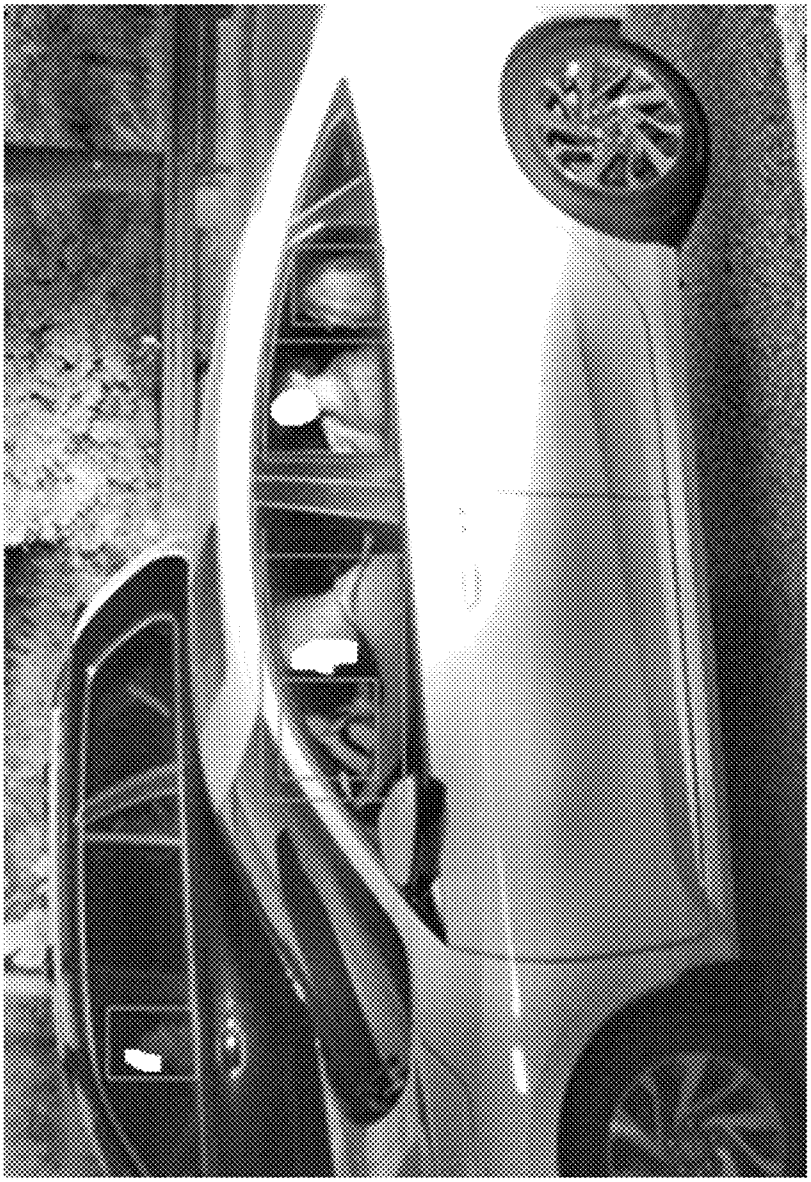
Figure 10D:
Figure 10E:
Figure 10F:
Figure 10G:

FIG. 10A shows an example visual representation wherein bounding boxes have been accurately associated with four occupants in a single vehicle. FIGS. 10B-10D show example visual representations of multiple individuals being identified in multiple vehicles across multiple lanes. FIG. 10E includes bounding boxes identifying an occupant despite tinted windows. FIG. 10F shows an example visual representation wherein four individuals have been accurately identified in the first detected vehicle, including an individual whose head is turned away from the imaging device. FIG. 10G shows an example visual representation wherein bounding boxes have been accurately associated with an occupant, and have correctly not identified an animal as an occupant.

Figure 11:
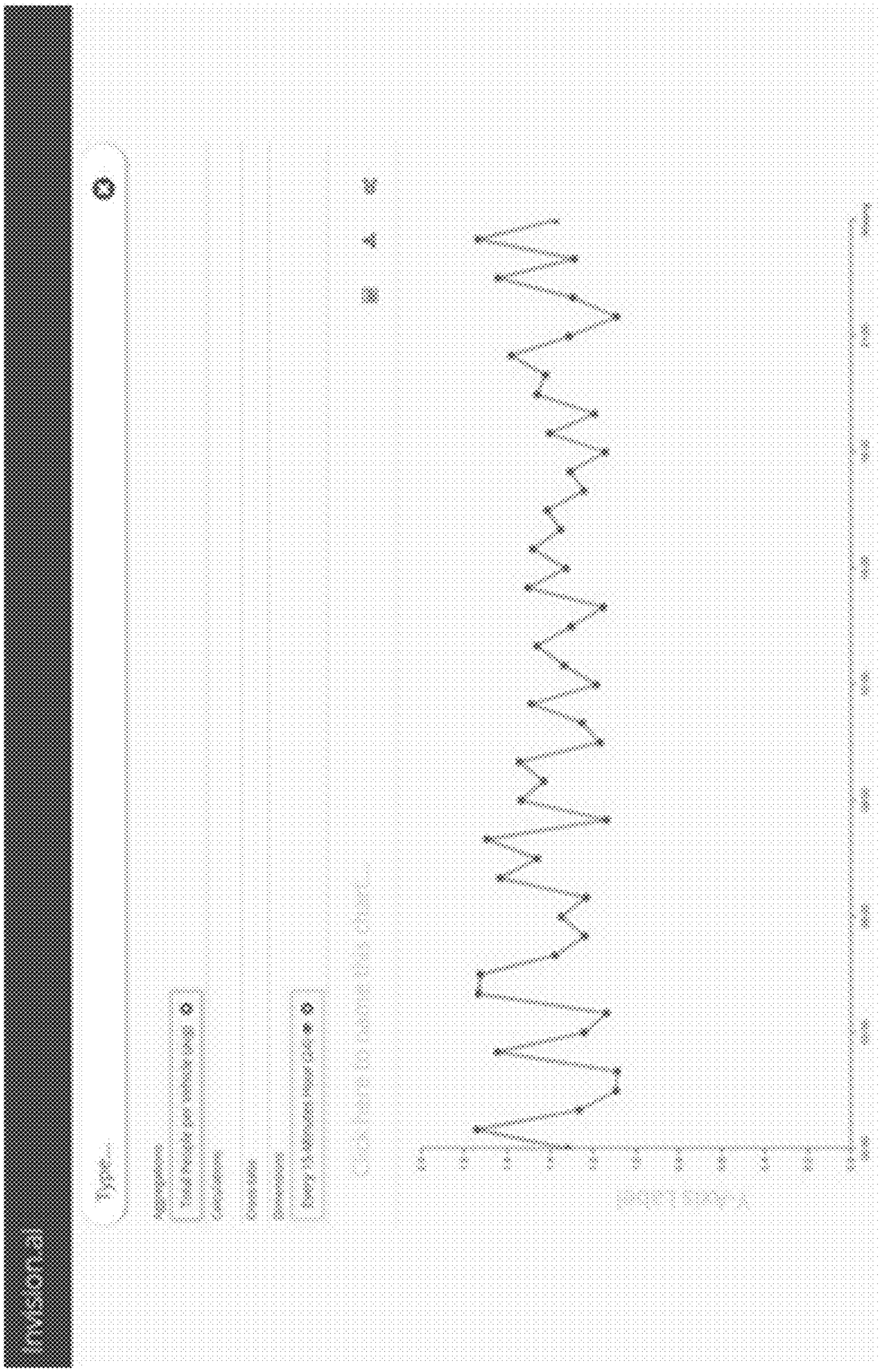
FIG. 11 is an example report interface for viewing vehicle occupancy, according to example embodiments.

In example embodiments, the report generated by the occupant detector 110 may include historical information about vehicle occupancy as determined by the system 100. For example, in the shown visual representation of FIG. 11, the occupant detector 110 outputs a report which includes an interactive chart representing the average total number of occupants detected over a period of time. Advantageously, such reports may be used to determine road capacity, road usage, and changing traveller compositions over time. In example embodiments, the occupant detector 110 outputs various report information into a visual interface capable of being interacted with. For example, the occupant detector 110 may output detection rates for storage or transmission.

The system 100 may be capable of achieving accuracy of detecting vehicle occupancy at significantly higher rates than can be achieved by human observation.

In some embodiments, for example, once the report is generated and transmitted to the tolling authority, or other third party, the system 100 deletes all local storage of the plurality of images associated with the occupancy detection.

In example embodiments, the system 100 may include one or more privacy features to prevent the imaging data from being inappropriately authorized. The computing device 102 may be configured to process the image with the occupant detector 110 locally to prevent loss of sensitive image data. The system 100 may store data (e.g., on database 112) on hard drives that are encrypted, in addition to encrypting every file (image or otherwise) associated with the operation of the system 100. In some embodiments, the computing device 102 may be configured to, prior to saving any image, detect faces in the images and blur beyond recognition any detected faces. Any transmission of data originating from within system 100 (e.g., command signals, images, etc.) may be encrypted prior to transmission, and any stored data within the system 100 may be configured to be deleted after a data retention deadline passes.

In example embodiments, system 100 may be configured to save and transmit only the images associated with deemed violators of vehicle occupation rules, thereby further minimizing the scale possible breaches.

Figure 12:
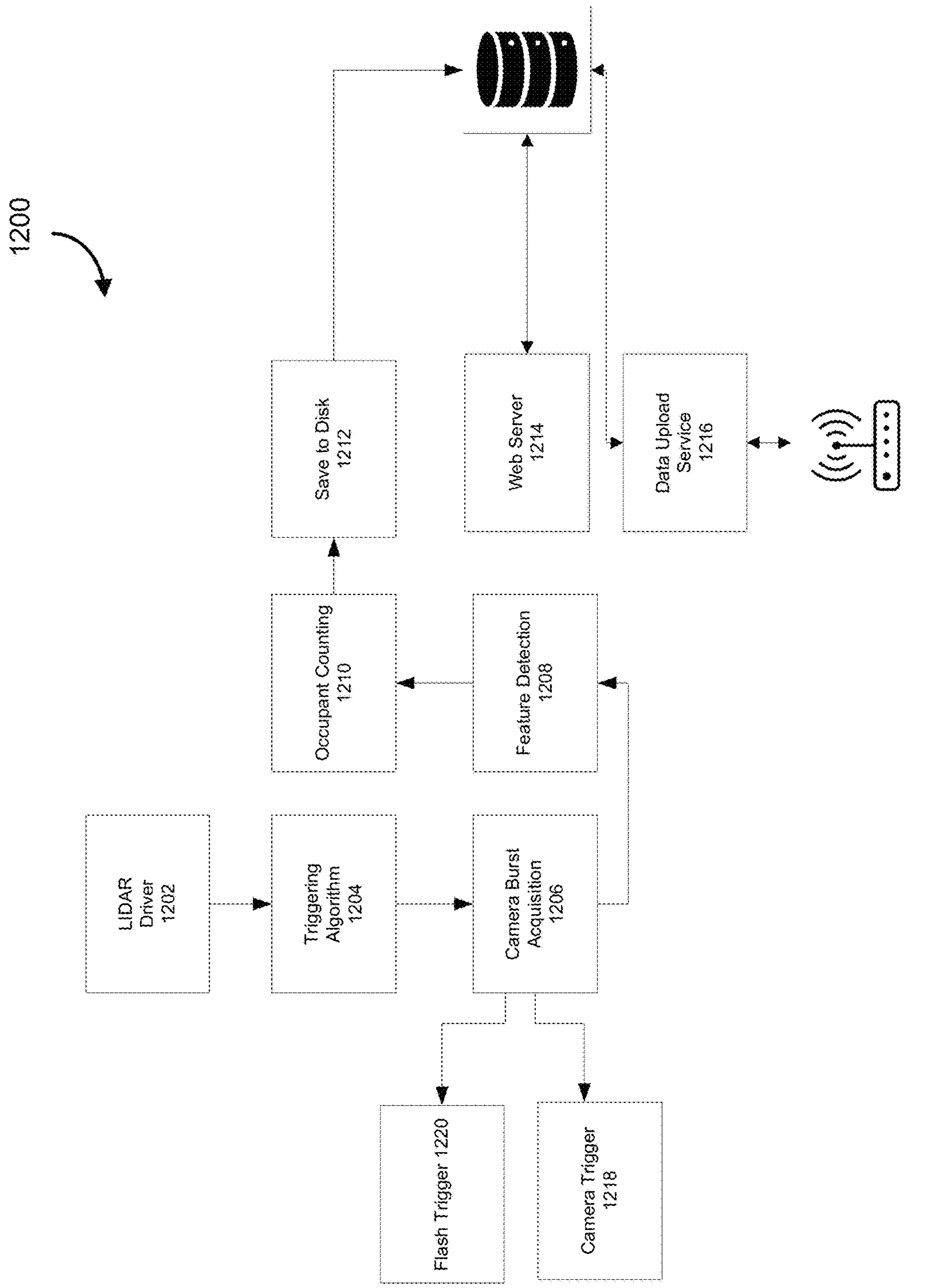
FIG. 12 is an architecture diagram of the system of FIG. 1, according to example embodiments.

FIG. 12 is an architecture diagram 1200 of the system 100, according to example embodiments.

In FIG. 12, at step 1202, the vehicle detector(s) 114 detects and timestamps LIDAR data at high frequency.

At step 1204, the system 100 processes the received LIDAR data with a signal processing algorithm to detect a passing vehicle with low latency in one or more Lanes of Interest (LoI). In example embodiments, as described, the signal processing techniques determine whether the detected range changes.

At step 1206, the imaging device(s) 118 are activated to capture images and light emitter(s) 116 are activated (shown camera trigger 1218 as flash trigger 1220). In example embodiments, imaging device(s) 118 and light emitter(s) 116 are activated simultaneously.

At step 1208, the computing device 102 detects features of interest in the captured images. For example, computing device 102 may perform method 900.

At step 1210 the computing device 102 determines the number of occupants in the regions of interest of step 1208.

At step 1212, optionally, the computing device 102 may store all or some of the received and processed data. For example, the computing device 102 may store the received images into database 112, including a timestamp and metadata (number of people, debugging data, camera parameters, LIDAR triggering information, etc.).

At step 1214, the computing device 102 may transmit the stored data to a web server, such as the web server of a system operator.

The web server, which may be a separate computing device 102, remote to the computing device located on the roadside unit, may run in parallel to the roadside system (e.g., system 514) to access the latest acquisitions and inspect results from the system. The web server also can be used to tune configuration parameters such as shutter time, camera gain and desired Lanes of Interest for the roadside system.

According to example embodiments, the computing device 102 may determine at step 1204, or at any point after the vehicle detector(s) 114 has triggered, whether the vehicle detector(s) 114 was correct in determining a vehicle detection, referred to as trigger accuracy. Trigger accuracy may be an important aspect that determines overall performance of system 100.

Trigger accuracy may be represented by the trade-off between two error types: false triggers (triggering when no vehicle is there typically because of rain, dust or snow) and missed triggers (not triggering when a vehicle is in fact there).

The computing device 102 can be configured to reject false triggers (e.g., if no vehicle is present in the set of acquired images, said images are simply discarded), as false triggers can cause premature aging of the system.

In example embodiments, the system 100 is trained to reduce both false triggers and missed triggers to a minimum. Example field test results are shown below:

| Condition (Day & Night) | True Trigger (100%-missed) | False Trigger |
|---|---|---|
| Ideal weather | 99% | 1% |
| Light rain/fog/snow | 97% | 4% |
| Heavy rain/ fog/snow | 84% | 11% |

In example embodiments, the computing device 102 may determine at step 1204 whether the occupant detector 110 was correct in determining a vehicle occupation, based on the system's 100 ability to overcome dark windows. For example, the system 100 may use ultra-high power narrow-band narrow-field Infrared (IR) light emitter(s) 116 with matched imaging device(s) 118 camera sensor and filters. The light emitter(s) 116 may use a light wavelength that simultaneously maximizes penetration of window tint and minimizes interference from the sun, and in example embodiments, the system 100 can have two large LED panel light emitter(s) 116 capable of penetrating window tint at a distance of up to 9 meters. The occupant detector 110 may review images to determine whether the images include vehicles where a detection signal is received, and determine whether a vehicle is present in the images.

In example embodiments, the computing device 102 may determine at step 1204 whether the occupant detector 110 was correct in determining a vehicle detection, based on the system's 100 ability to distinguish between humans and other objects. For example, the occupant detector 110 may be a deep neural network, trained on training data consisting of over 250,000 examples specific to the vehicle occupancy detection (VOD) case, as well as millions of training images outside of the VOD context for further robustness. As a result, the occupant detector 110 may be able to distinguish human beings in some of the most difficult poses compared to animals or other objects. According to example embodiments, the use of infrared imaging may be able to distinguish human beings from dolls as doll skin material may react differently to the infrared illumination to a degree sufficiently different compared to human skin.

In example embodiments, the computing device 102 may determine at step 1204, or at any point thereafter, whether the occupant detector 110 was correct in determining a vehicle detection, based on the system's 100 ability to detect curtains and possible obstructions (e.g., curtains, pants hanging, etc.) for further review. For example, the computing device 102 may be trained to, instead of detecting no occupants where curtains are shown, flag images with detected curtains for further validation.

At step 1216, the computing device 102 may upload the stored data with a data upload service.

Figure 13:
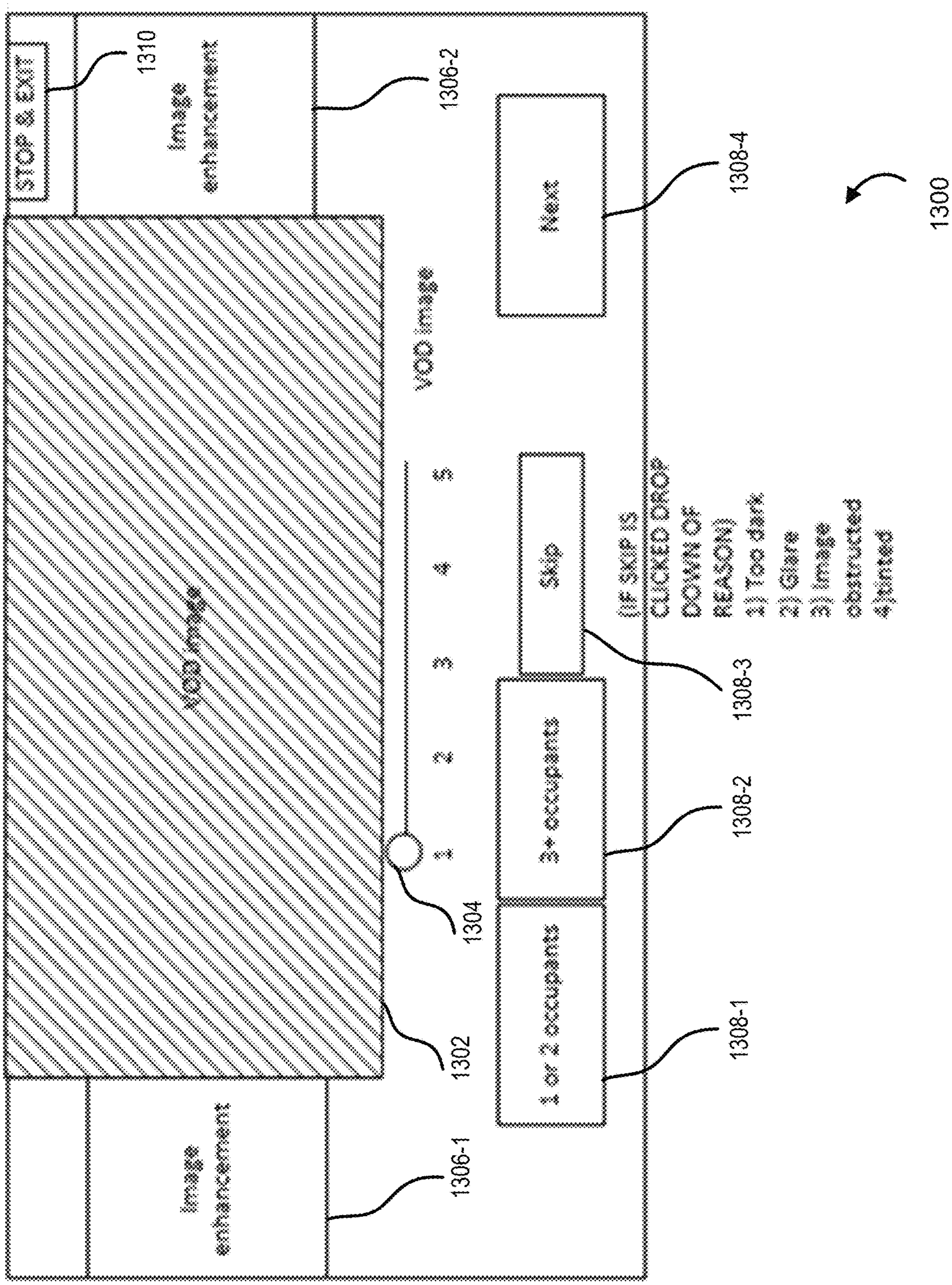
FIG. 13 is an example reviewing interface for vehicle occupancy detection validation, according to example embodiments.

The computing device 102 may prompt a user to validate the occupancy detection in response to an image being flagged, or in response to a suspected trigger accuracy error. Referring now to FIG. 13, an example user interface 1300 for validating use occupancy is shown.

In the shown embodiment, user interface 1300 includes an image display panel 1302, an image display slide 1304, and image enhancement panels 1306-1 and 1306-2.

The image display slide 1304 may be used by the user to control the image displayed in the image display panel 1302. In the shown embodiment, five images are associated with an occupancy detection, and the slider allows for changing the image display panel 1302 to any of the five images.

Each of image enhancement panels 1306-1 and 1306-2 may show an enlarged view of a portion of the image shown in image display panel 1302 for easier viewing. In some embodiments, the image enhancement panels 1306-1 and 1306-2 show the previous and subsequent image associated with the particular vehicle object detection.

Validation may consist of receiving user input associated with any one of occupant validation input 1308-1, occupant validation input 1308-2, occupant validation input 1308-3, and occupant validation input 1308-4 (hereinafter the occupant validation inputs). User selection of the occupant validation inputs can indicate the correct number of occupants in the images shown in image display panel 1302. For example, user selection of the occupant validation input 1308-1 and occupant validation input 1308-2 can be indicative of 1 or 2 occupants, or more than 3 occupants. In example embodiments, various numbers of occupant validation inputs are contemplated.

User selection of occupant validation input 1308-3, which is representative that the image cannot be validated, can trigger the generation and display of a drop down menu which includes selectable elements for indicting the reason the image cannot be validated. In some embodiments, the drop down menu includes the following reasons: the image was too dark, too much glare, the image was obstructed, and the tint was not overcome.

Occupant validation input 1308-4 may be used to cycle between occupancy detection. Exit element 1310 can be used to stop validation of the selected image.

In example embodiments, a further imaging device (not shown) is used with the system 100, which will provide image data used to validate the detected vehicle occupancy. For example, imaging device(s) 118-3 of FIG. 7 may be used as this further imaging device. Images captured by the imaging device may be used for monitoring and tuning purposes, and accessed through interface 1300.

Figure 14:
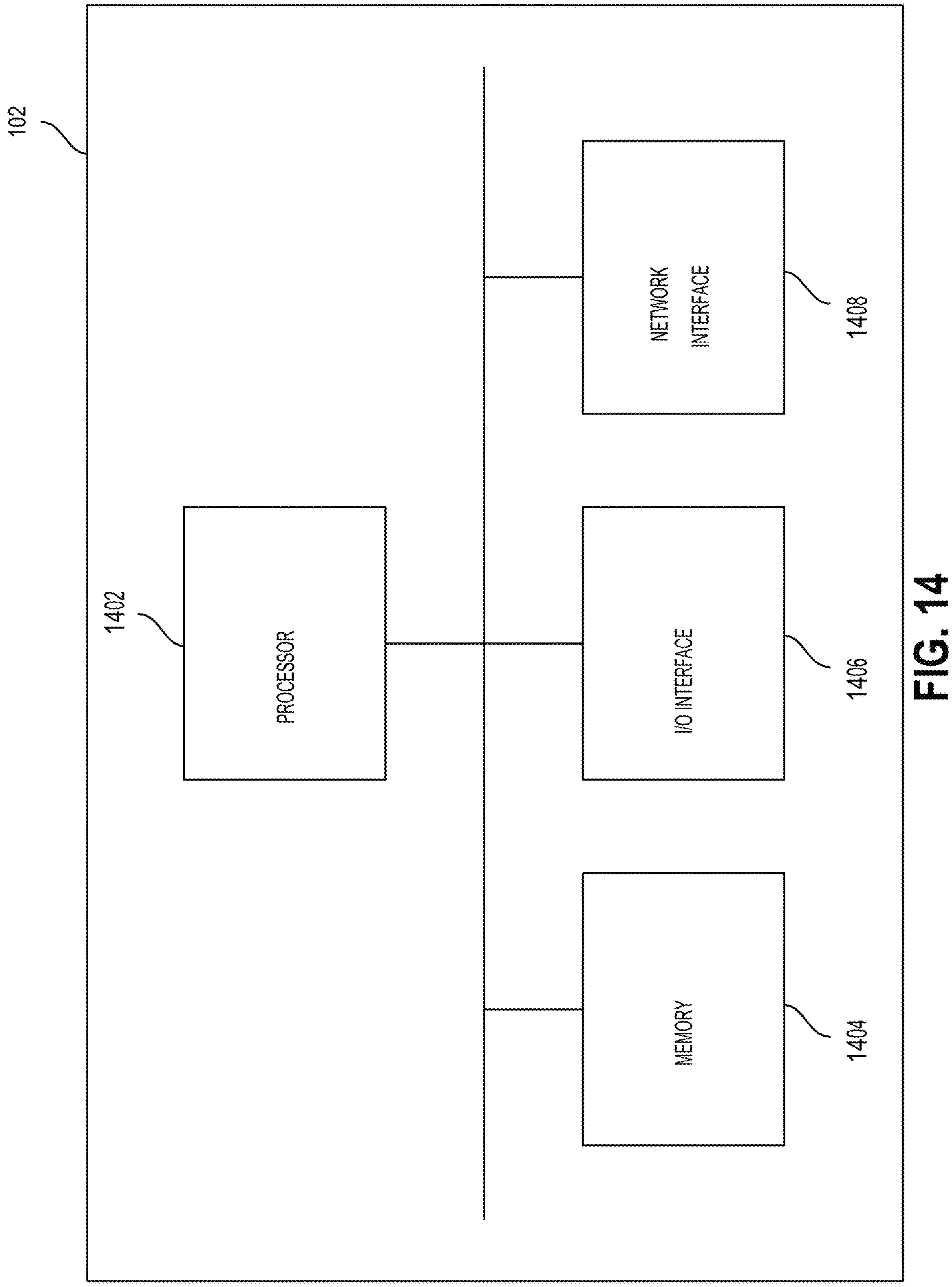
FIG. 14 is an example schematic diagram of a computing device, in accordance with an embodiment.

FIG. 14 is a schematic diagram of computing device 102, in accordance with an embodiment.

As depicted, computing device 102 includes at least one processor 1402, memory 1404, at least one I/O interface 1406, and at least one network interface 1408.

Each processor 1402 may be, for example, any type of microprocessor or microcontroller (e.g., a special-purpose microprocessor or microcontroller), a digital signal processing (DSP) processor, an integrated circuit, a field programmable gate array (FPGA), a reconfigurable processor, a programmable read-only memory (PROM), or any combination thereof.

Memory 1404 may include a suitable combination of any type of computer memory that is located either internally or externally such as, for example, random-access memory (RAM), read-only memory (ROM), compact disc read-only memory (CDROM), electro-optical memory, magneto-optical memory, erasable programmable read-only memory (EPROM), and electrically-erasable programmable read-only memory (EEPROM), Ferroelectric RAM (FRAM) or the like.

Each I/O interface 1406 enables computing device 102 to interconnect with one or more input devices, such as a keyboard, mouse, camera, touch screen and a microphone, or with one or more output devices such as a display screen and a speaker.

Each network interface 1408 enables computing device 102 to communicate with other components, to exchange data with other components, to access and connect to network resources, to serve applications, and perform other computing applications by connecting to a network (or multiple networks) capable of carrying data including the Internet, Ethernet, plain old telephone service (POTS) line, public switch telephone network (PSTN), integrated services digital network (ISDN), digital subscriber line (DSL), coaxial cable, fiber optics, satellite, mobile, wireless (e.g., Wi-Fi, WiMAX), SS7 signaling network, fixed line, local area network, wide area network, and others, including any combination of these.

For simplicity only, one computing device 102 is shown but computing device 102 may include multiple computing devices 102. The computing devices 102 may be the same or different types of devices. The computing devices 102 may be connected in various ways including directly coupled, indirectly coupled via a network, and distributed over a wide geographic area and connected via a network (which may be referred to as "cloud computing").

For example, and without limitation, a computing device 102 may be a server, network appliance, set-top box, embedded device, computer expansion module, personal computer, laptop, personal data assistant, cellular telephone, smartphone device, UMPC tablet, video display terminal, gaming console, or any other computing device capable of being configured to carry out the methods described herein.

In some embodiments, a computing device 102 may function as a client device, or data source.

In some embodiments, each of the vehicle detector controller 104, the light emitter controller 106, the imaging device controller 108, the occupant detector 110, and the second imaging device controller 122 are a separate computing device 102. In some embodiments, the vehicle detector controller 104, the light emitter controller 106, the imaging device controller 108, the occupant detector 110, and the second imaging device controller 122 are operated by a single computing device 102 having a separate integrated circuit for each of the said components, or may be implemented by separate computing devices 102. Various combinations of software and hardware implementations of the vehicle detector controller 104, the light emitter controller 106, the imaging device controller 108, the occupant detector 110, and the second imaging device controller 122 are contemplated. In some embodiments, all or parts of the vehicle detector controller 104, the light emitter controller 106, the imaging device controller 108, the occupant detector 110, and the second imaging device controller 122 may be implemented using conventional programming languages such as Java, J #, C, C++, C#, Perl, Visual Basic, Ruby, Scala, etc. In some embodiments, these components of system 100 may be in the form of one or more executable programs, scripts, routines, statically/dynamically linkable libraries, or the like.

For the confidence interval, training of the occupant detector 110 may include distinguishing between false positives and false negatives.

The occupant detector's 110 accuracy (alternatively referred to as performance) may be assessed (for example, during training) using calculations of False Positive (FP) and False Negatives (FN), which may vary depending on the application.

Simple 2-Stage Model—High Vs. Low Occupancy

The most common objective of the occupant detector 110 is to distinguish between a high-occupancy vehicle (for example, a vehicle with 2 or more occupants) and a low-occupancy vehicle (for example, a vehicle with only a driver—single occupant). The system performance can be expressed as a "confusion matrix" of 4 numbers (N1, N2, N3, N4). The 4 numbers in the confusion matrices should be independent nonnegative integer numbers. The numbers do not need to add up to 100& row-wise or column-wise. A confusion matrix can include the following:

TABLE 1

Confusion Matrix

| | | Predicted Occupancy | |
|---|---|---|---|
| | | 1 occupant | 2+ occupants |
| Actual occupancy | 1 occupant | TP | FN |
| | 2+ occupants | FP | 1 TN |

The confusion matrix example shows the rates at which actual "x occupant vehicles" are identified as "y occupant vehicles" for all possible combinations of "x" and "y". The confusion matrix (and therefore system performance) is completely characterized by two types of errors, namely (1) False Negatives (Top-right corner, red, "FN"): A low-occupancy vehicle is incorrectly seen as high-occupancy, in a high occupancy vehicle (HOV) context, this means the percentage of violators that are given a "free pass", and (2) False Positives (Bottom-right corner, red, "FP"): A high-occupancy vehicle is incorrectly seen as low-occupancy. In an HOV context, FP represents the percentage of honest road users that are wrongfully ticketed.

The cells in the confusion matrix that represent correct guesses are related to the error rates as shown in Table 1. These errors are not a specific quality of the system 100 but are rather the nature of the vehicle occupancy detection (VOD).

The system 100 may have the capability to adjust a relative weight of the FP errors and the FN errors before or during roadside deployment. Alternatively stated, the system 100 may trade one type of error for another depending on the configuration. The system 100 may be adjusted based on a wide range of FN and FP variations. For example, according to some embodiments, the system 100 can be configured such that both types of errors (wrong tickets and free passes) are given equal importance. In other example embodiments, the system 100 can be setup in a mode where wrong tickets are given more importance and reduced at the expense of increased free passes. Multiple variations of relative weighing of the FN and FP errors are contemplated.

In example embodiments, the system 100, instead of determining the mutually exclusive "low-occupancy" or "high-occupancy" may output (e.g., in a report) a continuous probability/confidence that can be normalized. The closer the confidence/probability value can provide an indication of how confident the system 100 is about the detected vehicle having low occupancy. A road operator may select to flag or ticket or take other actions with respect to all vehicles above the threshold confidence. If the threshold is normalized to represent sensible/meaningful numbers, the threshold can be determined or configured by operators of the system 100.

In example embodiments, the degree of confidence (or confidence value) can be discretized, such that various confidence values are associated with various pre-set use cases, or any number of operating modes may be configured by the operator. For example, a confidence threshold can be configured for a first mode of operation of system 100 in order to ticket individuals. The greater the confidence threshold, the less risk the tolling operator will have on creating a false positive. However, the tolling operator will operate with a higher chance of missing violations with such a high confidence threshold.

Some example embodiments of system configuration for relative weight of the FP errors and the FN errors (alternatively referred to as modes) are further described below:

Example Mode A—In example mode A, the system 100 is deployed such that the occupant detector 110 is trained that wrongfully identifying honest users has an equal importance to giving violators a free pass. For example, this configuration may be used in an area where a fair amount of both low-occupancy and high occupancy vehicles are expected. In this mode, both FP and FN errors are treated as equally important.

TABLE 2

Mode A - Confusion Matrix for the system where both error types are considered of equal importance

| | | Predicted Occupancy | |
|---|---|---|---|
| | | 1 occupant | 2+ occupants |
| Actual occupancy | 1 occupant | 908 | 92 |
| | 2+ occupants | 88 | 912 |

In an example configuration in accordance with mode A, the test results are shown in Table 2 above, and there is a computed chance that the system will make an error and give either a "free pass" or a wrong ticket.

Example Mode B—In example mode B, the occupant detector 110 is trained to emphasize providing some violators a free pass at the expense of significantly reducing the number of honest users that are wrongfully ticketed. Example mode B may be advantageously deployed in a high-occupancy lane where it is expected that relatively more high-occupancy vehicles are present, such as HOV lanes, to increase faith in the system 100. In example mode B, the FP is reduced relative to the FN. Stated alternatively, the FP is reduced at the expense of increasing FN.

TABLE 3

Mode-B - Confusion Matrix where false positives (honest road users being ticketed) is given more importance than false negatives (giving a violator a pass)

| | | Predicted Occupancy | |
|---|---|---|---|
| | | 1 occupant | 2+ occupants |
| Actual occupancy | 1 occupant | 837 | 163 |
| | 2+ occupants | 18 | 982 |

Table 3 shows example experimental results where the system 100 is trained to operated according to model B, where false positives (honest road users being ticketed) is given more importance than false negatives (giving a violator a pass). As is shown in Table 3, this mode makes LESS mistakes on actual 2+ occupant vehicles, and there is a chance of giving a wrong ticket.

According to example embodiments, where the system 100 is setup in a HOV lane and the expectation will be that the majority of road users are high-occupancy, the overall system accuracy may be adjusted if mode B is employed.

In example embodiments, the system 100 can be configured to switch between example modes. For example, during an initial phase, it may be expected that the target lane will experience many cases of a single occupant within a detected vehicle travelling in the HOV lanes and violating the law, and therefore mode A may be employed. This initial phase may include occupants of road vehicles "testing out" the HOV lanes or the system 100, and the tolling system described herein may be configured to issue warnings to road users during the initial phase.

As understanding and use of the HOV lanes increases, it may be likely that the distribution of detected vehicles will shift such that the large majority of users are honest high occupancy vehicles. At that time, the system 100 may be configured to operate according to mode B and experience a system with overall high accuracy. The system 100 uses a method to adaptively change the optimal trade-off of the occupancy overcounting and undercounting errors based on traffic patterns and road user behavior. The system learns and adapts overtime from toll or enforcement data gathered and fed back into the system 100 over consecutive time intervals of the system's 100 operation on the road."

3-Stage Model

System 100 may be configured to detect the number of occupants in the vehicle, irrespective of a legal requirement for occupancy within a particular lane. In some embodiments, for example, the calculation for the vehicle occupancy accuracy may be more complex if multiple options are to be determined, such as distinguishing between 1, 2, 3+ occupants where are all equally important. The system 100 may be able to achieve the following example performance shown in Table 4:

TABLE 4

Confusion Matrix when all 1, 2, 3+ errors are deemed equally important

| Actual/Predicted | 1 occupant | 2 occupants | 3+ occupants |
|---|---|---|---|
| 1 occupant | 90.1% | 9.2% | 0.7% |
| 2 occupants | 9.5% | 85.7% | 4.8% |
| 3+ occupants | 0% | 10% | 90% |

Each of the different modes may be learned during a training stage for each system 100. The training stage can configure different operating parameters that corresponds to the desired weighing of FP and FN, balancing the different types of errors and minimizing manual intervention. The system 100 can be adapted to a vast range of FP and FN conditions even after deployment.

The embodiments of the devices, systems and methods described herein may be implemented in a combination of both hardware and software. These embodiments may be implemented on programmable computers, each computer including at least one processor, a data storage system (including volatile memory or non-volatile memory or other data storage elements or a combination thereof), and at least one communication interface.

Figure 16:
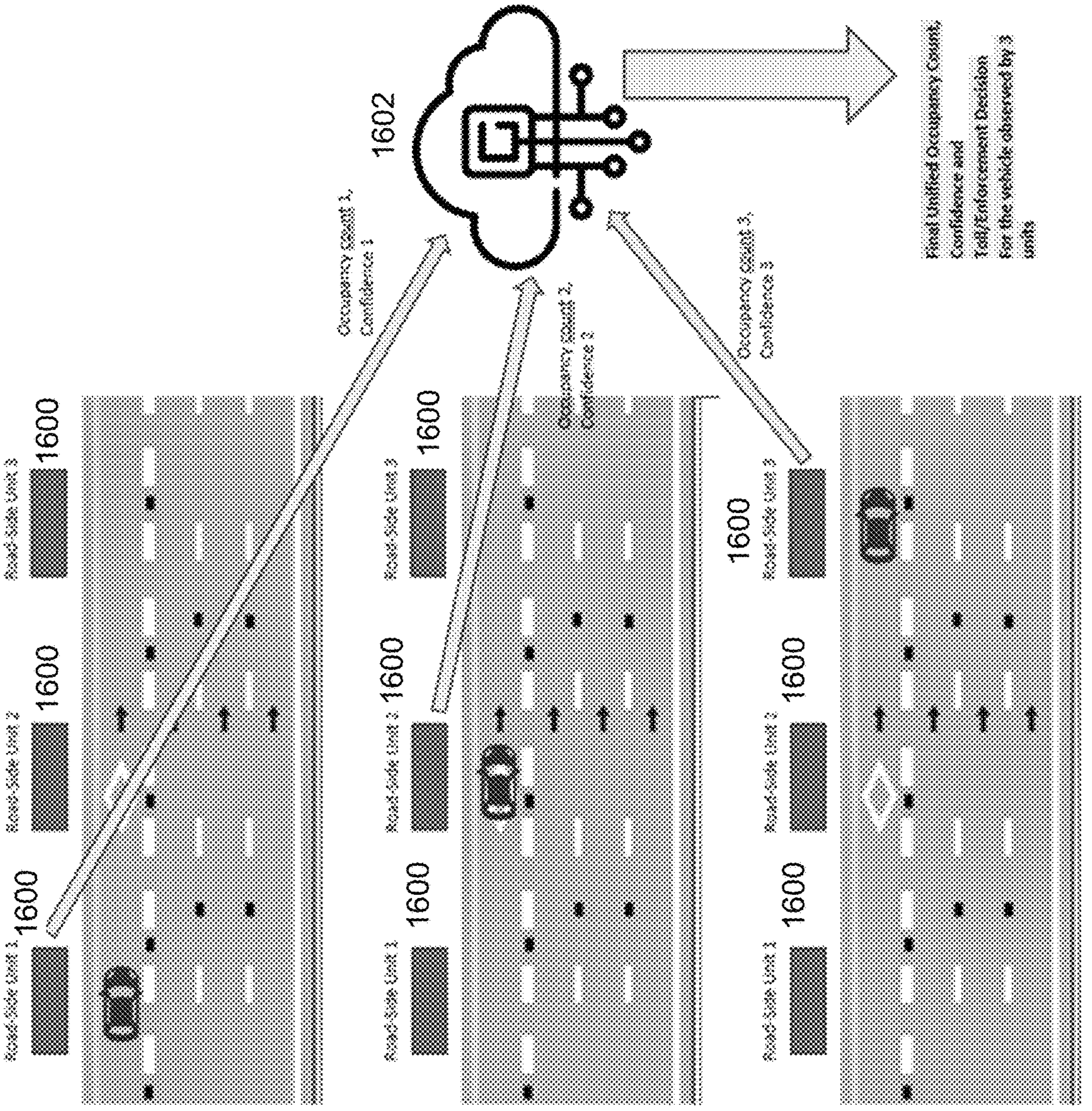
FIG. 16 is an example schematic diagram of a cloud server and road side units in accordance with an embodiment.

FIG. 16 shows an example system with road-side units (iRSU) 1600 transmitting data to a cloud server 1602. The iRSU 1600 has an imaging device that captures successive images of vehicles moving along in a lane on a highway or road.

The systems described throughout the description can be packaged and miniaturized into road side units (iRSU) 1600 with adjustable mechanical and software components. Multiple such units 1600 can be deployed on a region of road (highway or urban streets) with different mechanical and software configurations. As a vehicle travels through the region of the road, the vehicle gets observed by these different units 1600. Each unit 1600 can have different mechanical and software configuration, and captures its own successive images from different angles and configurations and makes its own occupancy prediction. Each unit 1600 uploads its unique prediction and the confidence the unit has over the prediction with a unique vehicle identifier (for example: license plate) on a cloud server 1602. Software on the cloud server 1602 then fuses all data coming from different units 1600 for a single vehicle. This method produces a unified higher-fidelity determination for each vehicle which then can enable making high accuracy toll or enforcement decisions. The system can be a server 1602 connected to a network of road side units 1600 capable of higher level performance (e.g., swarm intelligence). This higher level performance can be obtained because different units 1600 can have different configurations and can collectively make better decisions based on different fusion methods including but not limited to Bayesian estimation and different voting schemes.

The road-side unit 1600 is configured to capture images of vehicles travelling along a lane of a road. The road side unit can capture images from a fixed perspective. The successive images are, for each vehicle, analyzed to determine a likely vehicle occupancy. As a result of capturing multiple images from the fixed perspective, and further as a result of the images being captured from a roadside position, the images between installations may allow for more robust training, and portable occupancy detection approaches, which are adaptable to a variety of operating environments. The use of the multiple images being captured from a fixed roadside position also allows the system to generate a robust estimation of the vehicle occupancy without the need for expensive or overhead systems that are difficult to install. The roadside system may require fewer parts, have lower maintenance costs, and be easier to deploy. A central server 1602 can connect to all units 1600 and collect data from the units 1600 for processing.

In some embodiments, there is provided a roadside occupancy detector for detecting vehicle occupancy of a vehicle travelling in an expected direction of travel along a road. The roadside occupancy detector (or unit 1600) can have a first roadside imaging device positioned on a roadside, having a first field of view of the road, the first field of view incident on a side of the vehicle when the vehicle is on the road within the first field of view. The unit 1600 has a first roadside light emitter emitting light towards vehicles in the first field of view. The unit 1600 has a roadside vehicle detector. In some embodiments, the unit 1600 has a processor, in communication with a memory, configured to: receive a signal from the roadside vehicle detector indicating that the vehicle is within or proximate, relative to the expected direction of vehicle travel, to the first field of view; command the first roadside light emitter to emit light according to a first pattern for a first duration; command the first roadside imaging device to capture images of the side of the vehicle according to a second pattern associated with the first pattern, during a second duration associated with the first duration; receive the captured images of the side of the vehicle from the first roadside imaging device; compute a vehicle occupancy of the vehicle by, in each of the captured images: determining one or more regions of interest of the vehicle in each of the captured images; determining the vehicle occupancy as a number of visible occupants in the one or more regions of interest; and determining a most likely number of occupants based on each determined vehicle occupancy; and transmit the vehicle occupancy to a monitoring system.

Figure 17:
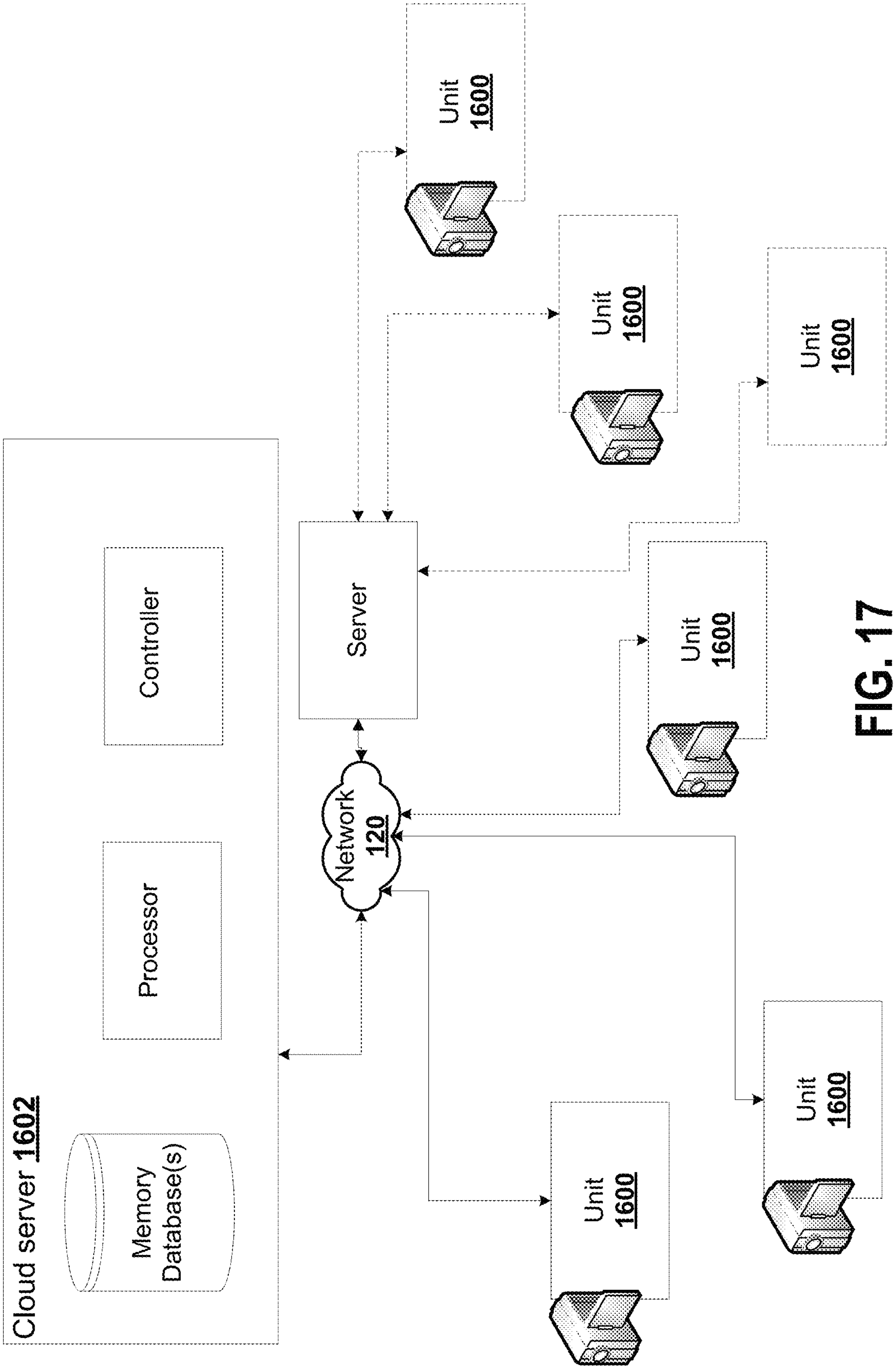
FIG. 17 is an example schematic diagram of a cloud server and road side units in accordance with an embodiment.

FIG. 17 shows another example system with road side units 1600 transmitting data to a cloud server 1602. A set of units 1600 can connect to an intermediate server which can connect to the cloud server 1602, in some embodiments. The road side units 1600 can send data to the cloud server 1602 such as occupancy count, confidence value, enforcement decisions for observed vehicles.

Program code is applied to input data to perform the functions described herein and to generate output information. The output information is applied to one or more output devices. In some embodiments, the communication interface may be a network communication interface. In embodiments in which elements may be combined, the communication interface may be a software communication interface such as those for inter-process communication. In other embodiments, there may be a combination of communication interfaces implemented as hardware, software, and combination thereof.

In an aspect, a system for detecting occupancy of a vehicle in a road is disclosed. The system includes an imaging device adjacent to the road, having a field of view of the road. A side of the vehicle is in the field of view when the vehicle is on the road within the field of view. The system includes a first light emitter adjacent to the road and emitting light towards vehicles in the field of view. There can be a vehicle detector adjacent to the road and upstream of the imaging device relative to an expected direction of vehicle travel, for example. A processor, in communication with a memory, is configured to receive a signal from the vehicle detector, indicating that the vehicle is within or upstream, relative to the expected direction of vehicle travel, of the field of view. The processor transmits, in response to receiving the signal, a first command signal to the light emitter to emit light according to a first pattern for a first duration, and a second command signal to the imaging device to capture images of the side of the vehicle according to a second pattern associated with the first pattern, for a second duration associated with the first duration. The processor receives the captured images of the side of the vehicle from the imaging device, and computes a vehicle occupancy of the vehicle based on the captured images. The processor transmits the vehicle occupancy to a monitoring system.

In example embodiments, the imaging device, the first light emitter, and the vehicle detector are attached to a mobile roadside structure adjacent to the road at a height taller than an expected barrier.

In example embodiments, the imaging device is positioned to have a yaw angle relative to a horizontal axis perpendicular to the expected direction of vehicle travel such that each of the images captured by the imaging device includes different perspectives of the vehicle based on the first yaw angle. In example embodiments, the different perspectives are empirically determined so as to yield different angles of any occupants in a rear and front side window.

In some embodiments, the imaging device can capture multiple images from the vehicle so that occupants are seen from different perspectives as the vehicle travels horizontally across the field of view, which can be reflected in extracted data from the images. An imaging device can have a large horizontal field of view, and the system may be able to extract data for change of perspective by taking multiple successive images as the vehicle is traveling from one end of the horizontal field of view to the other, even with a zero yaw angle. However, having a large of a field of view may not always possible or favorable for some other reasons. Using a nonzero yaw angle may accentuate the change of perspective within a limited horizontal motion of the vehicle in the field of view. Accordingly, the system computes data corresponding to change of perspective, and, in some embodiments uses the yaw angle as an example.

In example embodiments, the system further includes a second imaging device, adjacent to the road, a first height above the ground greater than a height above the ground of the imaging device. The second imaging device has a field of view of a second lane of the road, the second lane being further from the first imaging device than the first lane of the road. A side of a further vehicle is in the second field of view when the further vehicle is in the second lane within the second field of view. The system includes a second light emitter adjacent to the road and emitting light towards vehicles in the field of view of the second lane. The processor is further configured to receive a second signal from the vehicle detector indicating that a further vehicle is within or upstream, relative to the expected direction of vehicle travel, of the field of view of the second lane. The processor transmits, in response to receiving the second signal, a third command signal to the second light emitter to emit light according to a third pattern for a third duration, and a fourth command signal to the second imaging device to capture additional images of a side of the further vehicle according to a fourth pattern associated with the third pattern, for a fourth duration associated with the third duration. The processor receives the additional captured images of the side of the further vehicle from the second imaging device, and computes a vehicle occupancy of the further vehicle based on the additional captured images. The processor transmits the vehicle occupancy of the further vehicle to the monitoring system.

In example embodiments, to compute the vehicle occupancy of the vehicle, the processor is further configured to, in each of the captured images: determine one or more regions of interest of the vehicle in each of the plurality of captured images; reduce the plurality of captured images to the determined one or more regions of interest; determine a number of visible occupants in the reduced plurality of images; and determine a most likely number of occupants based on an occupant model most likely to fit all of the respective number of visible occupants in the captured images.

In example embodiments, the processor is further configured to monitor signals over time to determine an expected vehicle speed of the vehicle and adjust one or more parameters of the imaging device into a determined optimal configuration for capturing vehicles travelling the expected vehicle speed.

In example embodiments, the processor is further configured to monitor signals over time to determine an expected speed of the vehicle, and determine the first pattern and the first time window based on the expected vehicle speed.

In example embodiments, the processor is further configured to monitor signals over time to determine an expected speed of the vehicle, and determine one or more normalization parameters, the one or more normalization parameters adjusting the representation of the vehicle in the images to account for the expected vehicle speed. The processor generates a normalized vehicle model populated with each of the plurality of images processed with the respective normalization parameters to normalize the vehicle across the captured plurality to images.

In example embodiments, the system further includes a sensor for detecting ambient conditions, and the processor is further configured to receive ambient condition information from the sensor, determine an optimal configuration for the imaging device based on the received ambient condition, and transmit a further command signal to the imaging device capture images according to the optimal configuration. In example embodiments, the optimal configuration is an imaging device exposure gain or aperture.

In example embodiments, the light emitter is an LED emitting infrared or near infrared light and the first pattern is 120 pulses per second.

In example embodiments, the system further includes a license plate imaging device, and the processor is further configured to transmit another command signal to the license plate imaging device to capture images of the rear of the vehicle, and compute a license plate based on the rear end captured image.

In a further aspect, a method of configuring a system for detecting occupancy of a vehicle proximate to a road is disclosed. The method includes determining a distance from a target roadside mounting location to a target lane of the road, determining a width of the target lane, and determining a difference between the height of the ground at the target roadside mounting location and a height of the location of the target lane. The method includes determining a preferred mounting geometry of a light emitter, an imaging device, and a vehicle detector at the target roadside mounting location based on the width, the distance, and the difference; and installing the light emitter, the imaging device, and the vehicle detector to a mobile platform at the target roadside mounting location to enable the imaging device to capture successive images of a detected vehicle.

The method, in example embodiments, includes monitoring mounted positions of the light emitter, the imaging device, and the vehicle detector to determine whether the mounted positions coincide with the preferred mounting geometry on a display, and in response to determining the mounted positions of the light emitter, the imaging device, and the vehicle detector do not coincide with the preferred mounting geometry, displaying an error message on the display.

In example embodiments, the error message includes a correction parameter. Accordingly, the method can involve computing a correction parameter and providing visual guidance using augmented reality avatars on a display device. For example, the visual guidance can involve showing semi-transparent virtual lane markings overlaid on camera feed and asking the calibration technician to move the camera until the virtual lane markings match and cover the real lane markings on the road in the image feed displayed on the screen.

Throughout the following discussion, numerous references will be made regarding servers, services, interfaces, portals, platforms, or other systems formed from computing devices. It should be appreciated that the use of such terms is deemed to represent one or more computing devices having at least one processor configured to execute software instructions stored on a computer readable tangible, non-transitory medium. For example, a server can include one or more computers operating as a web server, database server, or other type of computer server in a manner to fulfill described roles, responsibilities, or functions.

The following discussion provides many example embodiments. Although each embodiment represents a single combination of inventive elements, other examples may include all possible combinations of the disclosed elements. Thus, if one embodiment comprises elements A, B, and C, and a second embodiment comprises elements B and D, other remaining combinations of A, B, C, or D, may also be used.

The term "connected" or "coupled to" may include both direct coupling (in which two elements that are coupled to each other contact each other) and indirect coupling (in which at least one additional element is located between the two elements).

The technical solution of embodiments may be in the form of a software product. The software product may be stored in a non-volatile or non-transitory storage medium, which can be a compact disk read-only memory (CD-ROM), a USB flash disk, or a removable hard disk. The software product includes a number of instructions that enable a computer device (personal computer, server, or network device) to execute the methods provided by the embodiments.

The embodiments described herein are implemented by physical computer hardware, including computing devices, servers, receivers, transmitters, processors, memory, displays, and networks. The embodiments described herein provide useful physical machines and particularly configured computer hardware arrangements. The embodiments described herein are directed to electronic machines and methods implemented by electronic machines adapted for processing and transforming electromagnetic signals which represent various types of information. The embodiments described herein pervasively and integrally relate to machines, and their uses; and the embodiments described herein have no meaning or practical applicability outside their use with computer hardware, machines, and various hardware components. Substituting the physical hardware particularly configured to implement various acts for non-physical hardware, using mental steps for example, may substantially affect the way the embodiments work. Such computer hardware limitations are clearly essential elements of the embodiments described herein, and they cannot be omitted or substituted for mental means without having a material effect on the operation and structure of the embodiments described herein. The computer hardware is essential to implement the various embodiments described herein and is not merely used to perform steps expeditiously and in an efficient manner.

Although the embodiments have been described in detail, it should be understood that various changes, substitutions and alterations can be made herein without departing from the scope as defined by the appended claims.

Moreover, the scope of the present application is not intended to be limited to the particular embodiments of the process, machine, manufacture, and composition of matter, means, methods and steps described in the specification. As one of ordinary skill in the art will readily appreciate from the disclosure of the present invention, processes, machines, manufacture, compositions of matter, means, methods, or steps, presently existing or later to be developed, that perform substantially the same function or achieve substantially the same result as the corresponding embodiments described herein may be utilized. Accordingly, the appended claims are intended to include within their scope such processes, machines, manufacture, compositions of matter, means, methods, or steps As can be understood, the examples described above and illustrated are intended to be exemplary only.

What is claimed is:

1. A system for detecting vehicle occupancy, the system comprising:

a plurality of roadside units, each roadside unit comprising a roadside imaging device to capture one or more images and a processor, in communication with a memory, configured to:

receive the one or more captured images from the roadside imaging device;

generate a unique vehicle identifier for a vehicle in the one or more captured images; and compute a vehicle occupancy of the vehicle based on the one or more captured images; and a monitoring system comprising a monitoring system processor, in communication with a monitoring system memory, configured to:

receive one or more vehicle occupancies of the vehicle with the unique vehicle identifier from one or more of the plurality of roadside units; and fuse the one or more vehicle occupancies of the vehicle to determine a most likely number of occupants in the vehicle.

2. The system of claim 1, wherein the monitoring system processor is further configured to make a toll or enforcement decision based on the most likely number of occupants in the vehicle.

3. The system of claim 1, wherein the plurality of roadside units are spaced apart in a region of a road.

4. The system of claim 1, wherein the vehicle occupancy of the vehicle is computed by:

in each of the one or more captured images:

determining one or more regions of interest, and determining a vehicle occupancy of the captured image based on the one or more regions of interest; and determining the vehicle occupancy of the vehicle based on each determined vehicle occupancy of the captured image.

5. The system of claim 4, wherein determining the vehicle occupancy of the captured image comprises detecting instances of occupants and no occupants in the regions of interest.

6. The system of claim 1, wherein each processor is further configured to generate a confidence for the vehicle occupancy of the vehicle, and wherein the monitoring system processor is configured to fuse the one or more vehicle occupancies of the vehicle to determine the most likely number of occupants in the vehicle based on one or more confidences for the one or more vehicle occupancies of the vehicle.

7. The system of claim 1, wherein the unique vehicle identifier is based on at least one of the one or more captured images of the vehicle.

8. The system of claim 1, wherein the unique vehicle identifier is based on a license plate of the vehicle.

9. The system of claim 1, wherein at least one of the plurality of roadside units further comprises a light emitter that emits light, wherein at least one of the one or more captured images is illuminated by the light emitter.

10. The system of claim 9, wherein the light emitter emits light according to a first pattern for a first duration and the roadside imaging device captures the one or more captured images according to a second pattern associated with the first pattern, during a second duration associated with the first duration.

11. The system of claim 1, further comprising one or more visual interfaces for viewing data relating to the one or more vehicle occupancies of the vehicle and the most likely number of occupants in the vehicle, wherein the monitoring system transmits the data to the one or more visual interfaces.

12. A method for detecting vehicle occupancy, the method comprising:

with one or more of a plurality of roadside units:

receiving one or more captured images from a roadside imaging device;

generating a unique vehicle identifier for a vehicle in the one or more captured images; and computing a vehicle occupancy of the vehicle based on the one or more captured images;

receiving one or more vehicle occupancies of the vehicle with the unique vehicle identifier from the one or more of the plurality of roadside units; and fusing the one or more vehicle occupancies of the vehicle to determine a most likely number of occupants in the vehicle.

13. The method of claim 12, wherein the method further comprises making a toll or enforcement decision based on the most likely number of occupants in the vehicle.

14. The method of claim 12, wherein the plurality of roadside units are spaced apart in a region of a road.

15. The method of claim 12, wherein computing the vehicle occupancy of the vehicle comprises:

in each of the one or more captured images:

determining one or more regions of interest, and determining a vehicle occupancy of the captured image based on the one or more regions of interest; and determining the vehicle occupancy of the vehicle based on each determined vehicle occupancy of the captured image; and wherein determining the vehicle occupancy of the captured image comprises detecting instances of occupants and no occupants in the regions of interest.

16. The method of claim 12, the method further comprising generating a confidence for each vehicle occupancy of the vehicle; and wherein fusing the one or more vehicle occupancies of the vehicle is based on one or more confidences for the one or more vehicle occupancies of the vehicle.

17. The method of claim 12, wherein the unique vehicle identifier is based on at least one of the one or more captured images of the vehicle.

18. The method of claim 12, wherein the unique vehicle identifier is based on a license plate of the vehicle.

19. The method of claim 12, wherein at least one of the one or more captured images is illuminated by a roadside light emitter.

20. The method of claim 19, the method further comprising:

emitting light according to a first pattern for a first duration with the light emitter, and capturing the one or more captured images with the roadside imaging device according to a second pattern associated with the first pattern, during a second duration associated with the first duration.

* * * * *